(12) United States Patent
Keevill et al.

(10) Patent No.: US 8,660,610 B2
(45) Date of Patent: Feb. 25, 2014

(54) SELF-CONFIGURING CELLULAR BASESTATION

(75) Inventors: Peter Keevill, Bath (GB); William Franks, Pewsey (GB); Richard Byrne, Berkshire (GB)

(73) Assignee: Ubiquisys Limited, Swindon (GB)

( * ) Notice: Subject to any disclaimer, the term of this patent is extended or adjusted under 35 U.S.C. 154(b) by 0 days.

(21) Appl. No.: 12/872,970

(22) Filed: Aug. 31, 2010

(65) Prior Publication Data

US 2010/0322426 A1 Dec. 23, 2010

Related U.S. Application Data

(62) Division of application No. 11/664,361, filed as application No. PCT/GB2006/002816 on Jul. 8, 2006.

(30) Foreign Application Priority Data

Aug. 1, 2005 (GB) .................................. 05 15888.6

(51) Int. Cl.
*H04B 1/38* (2006.01)
*H04M 1/00* (2006.01)

(52) U.S. Cl.
USPC ........................................ 455/561; 455/562.1

(58) Field of Classification Search
USPC .......... 370/328, 331, 338; 455/561, 436, 442, 455/422.1, 426.1, 432.1, 434, 525, 558
See application file for complete search history.

(56) References Cited

U.S. PATENT DOCUMENTS

| | | | |
|---|---|---|---|
| 5,438,608 A | 8/1995 | Kojima | |
| 5,448,762 A | 9/1995 | Ward | |
| 5,551,064 A | 8/1996 | Nobbe et al. | |
| 5,778,322 A | 7/1998 | Rydbeck | |
| 5,794,157 A | 8/1998 | Haartsen | |
| 5,884,145 A | 3/1999 | Haartsen | |
| 5,915,219 A | 6/1999 | Pöyhönen | |
| 6,014,563 A | 1/2000 | Szabo | |
| 6,052,595 A | 4/2000 | Schellinger et al. | |
| 6,141,565 A | 10/2000 | Feuerstein | |
| 6,201,972 B1 | 3/2001 | Hamabe | |

(Continued)

FOREIGN PATENT DOCUMENTS

| | | |
|---|---|---|
| CN | 1433645 | 7/2003 |
| CN | 1674689 | 9/2005 |

(Continued)

OTHER PUBLICATIONS

EP Examination Report dated May 29, 2008 issued in EP 06 765 134.9-2412.

(Continued)

*Primary Examiner* — Brandon Miller
(74) *Attorney, Agent, or Firm* — Weaver Austin Villeneuve & Sampson LLP

(57) ABSTRACT

A basestation 110 provides coverage for voice and data services within a building using GSM/GPRS and UMTS interfaces within existing networks, allowing use of existing mobile phones. The basestation also provides flexible interfacing to the network operator's core network 130 via the Unlicensed Mobile Access (UMA) standards as opposed to the usual Iub (UMTS) or Abis (GSM) interfaces used by conventional cellular basestations. Backhaul from the basestation units is achieved through the use of Digital Subscriber Line (DSL) connections over fixed telephone lines. This approach enables low-cost transport of data and voice using VoIP.

15 Claims, 22 Drawing Sheets

(56) References Cited

U.S. PATENT DOCUMENTS

| | | | |
|---|---|---|---|
| 6,236,859 B1 | 5/2001 | Morper | |
| 6,311,059 B1 | 10/2001 | Walton | |
| 6,314,294 B1 | 11/2001 | Benveniste | |
| 6,351,638 B1* | 2/2002 | Robinson | 455/418 |
| 6,377,803 B1 | 4/2002 | Ruohonen | |
| 6,421,328 B1 | 7/2002 | Larribeau et al. | |
| 6,473,413 B1 | 10/2002 | Chiou et al. | |
| 6,542,741 B2 | 4/2003 | Wallstedt et al. | |
| 6,615,035 B1 | 9/2003 | Lucidarme et al. | |
| 6,684,067 B2 | 1/2004 | Blanke et al. | |
| 6,729,929 B1 | 5/2004 | Sayers et al. | |
| 6,751,207 B1 | 6/2004 | Lee et al. | |
| 6,901,061 B1 | 5/2005 | Joo et al. | |
| 6,925,074 B1* | 8/2005 | Vikberg et al. | 370/338 |
| 6,944,426 B1 | 9/2005 | Esser et al. | |
| 6,970,680 B1 | 11/2005 | Tomoe | |
| 7,113,782 B2 | 9/2006 | Lucidarme et al. | |
| 7,248,886 B1 | 7/2007 | Ljungstroem et al. | |
| 7,266,393 B2* | 9/2007 | Latva-Aho et al. | 455/561 |
| 7,356,145 B2* | 4/2008 | Ala-Laurila et al. | 380/247 |
| 7,477,920 B2 | 1/2009 | Scheinert et al. | |
| 7,565,144 B2* | 7/2009 | Saifullah et al. | 455/436 |
| 7,596,124 B2* | 9/2009 | Brenes et al. | 370/338 |
| 7,606,190 B2* | 10/2009 | Markovic et al. | 370/328 |
| 7,635,269 B2* | 12/2009 | Oda | 439/71 |
| 2001/0044305 A1 | 11/2001 | Reddy et al. | |
| 2002/0089951 A1 | 7/2002 | Hyun et al. | |
| 2002/0118656 A1 | 8/2002 | Agrawal et al. | |
| 2002/0123348 A1 | 9/2002 | Willars et al. | |
| 2002/0131387 A1* | 9/2002 | Pitcher et al. | 370/338 |
| 2002/0165000 A1 | 11/2002 | Fok | |
| 2002/0191557 A1 | 12/2002 | Chow et al. | |
| 2002/0191561 A1 | 12/2002 | Chen et al. | |
| 2003/0032451 A1 | 2/2003 | Hu | |
| 2003/0058818 A1 | 3/2003 | Wilkes et al. | |
| 2003/0095520 A1 | 5/2003 | Aallbers et al. | |
| 2003/0119489 A1 | 6/2003 | Mohammed | |
| 2003/0147383 A1 | 8/2003 | Capers et al. | |
| 2004/0017786 A1 | 1/2004 | Shively | |
| 2004/0081159 A1 | 4/2004 | Pan et al. | |
| 2004/0152482 A1 | 8/2004 | Raffel et al. | |
| 2004/0166867 A1 | 8/2004 | Hawe | |
| 2004/0190477 A1 | 9/2004 | Olson et al. | |
| 2004/0204097 A1 | 10/2004 | Scheinert et al. | |
| 2004/0224684 A1 | 11/2004 | Dorsey et al. | |
| 2004/0240430 A1 | 12/2004 | Lin et al. | |
| 2005/0026655 A1 | 2/2005 | Giaimo et al. | |
| 2005/0032542 A1 | 2/2005 | Wilborn et al. | |
| 2005/0037766 A1 | 2/2005 | Hans et al. | |
| 2005/0088999 A1 | 4/2005 | Waylett et al. | |
| 2005/0118993 A1 | 6/2005 | Roux et al. | |
| 2005/0122900 A1 | 6/2005 | Tuulos et al. | |
| 2005/0129058 A1 | 6/2005 | Casaccia et al. | |
| 2005/0130657 A1 | 6/2005 | Creamer et al. | |
| 2005/0148368 A1 | 7/2005 | Scheinert et al. | |
| 2005/0153700 A1 | 7/2005 | Farnsworth et al. | |
| 2005/0255879 A1* | 11/2005 | Shi et al. | 455/552.1 |
| 2005/0265279 A1* | 12/2005 | Markovic et al. | 370/328 |
| 2005/0271009 A1 | 12/2005 | Shirakabe et al. | |
| 2006/0052085 A1 | 3/2006 | Gregrio Rodriguez et al. | |
| 2006/0062237 A1 | 3/2006 | Kim | |
| 2006/0142032 A1 | 6/2006 | Derakhshan et al. | |
| 2006/0172722 A1* | 8/2006 | Christensen et al. | 455/410 |
| 2006/0172752 A1* | 8/2006 | Harris et al. | 455/518 |
| 2006/0293038 A1* | 12/2006 | Walter et al. | 455/418 |
| 2007/0008885 A1* | 1/2007 | Bonner | 370/230 |
| 2007/0213086 A1 | 9/2007 | Claussen et al. | |
| 2008/0102794 A1* | 5/2008 | Keevill et al. | 455/411 |
| 2008/0108346 A1 | 5/2008 | Umatt et al. | |
| 2008/0254833 A1 | 10/2008 | Keevill et al. | |
| 2008/0259886 A1* | 10/2008 | Svarre et al. | 370/338 |
| 2009/0017864 A1 | 1/2009 | Keevill et al. | |
| 2010/0317405 A1 | 12/2010 | Keevill et al. | |
| 2013/0089055 A1 | 4/2013 | Keevill et al. | |

FOREIGN PATENT DOCUMENTS

| | | |
|---|---|---|
| DE | 19633925 | 3/1998 |
| EP | 0 766 427 | 4/1997 |
| EP | 0944274 A2 | 9/1999 |
| EP | 1 032 236 | 8/2000 |
| EP | 1 049 340 | 11/2000 |
| EP | 1 104 977 | 6/2001 |
| EP | 1 267 524 | 12/2002 |
| EP | 1 286 561 | 2/2003 |
| EP | 1 351 530 | 10/2003 |
| EP | 1 519 613 | 3/2005 |
| EP | 1 536 659 | 6/2005 |
| EP | 1 587 335 | 10/2005 |
| EP | 1 641 302 | 3/2006 |
| EP | 1 650 907 | 4/2006 |
| EP | 1 681 804 | 7/2006 |
| EP | 1 754 386 | 2/2007 |
| GB | 2321158 | 7/1998 |
| GB | 2355885 | 6/2001 |
| GB | 2419774 | 5/2006 |
| JP | A H08-023299 | 1/1996 |
| JP | A H08-237728 | 9/1996 |
| JP | 10-136442 | 5/1998 |
| JP | 2001197557 | 7/2001 |
| JP | A 2002-359590 | 12/2002 |
| JP | 2003274011 | 9/2003 |
| JP | 2004-522348 | 7/2004 |
| JP | 2005-184817 | 7/2005 |
| WO | WO 95/08902 | 3/1995 |
| WO | WO 97/50274 | 12/1997 |
| WO | WO 00/13377 | 3/2000 |
| WO | WO 00/28752 | 5/2000 |
| WO | WO 00/56100 | 9/2000 |
| WO | WO 00/74415 | 12/2000 |
| WO | WO 01/76276 | 10/2001 |
| WO | WO 01/93617 | 12/2001 |
| WO | WO 02/054820 | 7/2002 |
| WO | WO 02/063900 | 8/2002 |
| WO | WO 02/073883 | 9/2002 |
| WO | WO 02/093811 | 11/2002 |
| WO | WO 03/010908 | 2/2003 |
| WO | WO 03/028344 | 4/2003 |
| WO | WO 03/032616 | 4/2003 |
| WO | WO 03/061177 | 7/2003 |
| WO | WO 03/084096 | 10/2003 |
| WO | WO 03/085992 | 10/2003 |
| WO | WO 03/090013 | 10/2003 |
| WO | WO 2004/017585 | 2/2004 |
| WO | WO 2004/040938 | 5/2004 |
| WO | WO 2004/086788 | 10/2004 |
| WO | WO 2005/011134 | 2/2005 |
| WO | WO 2005/029889 | 3/2005 |
| WO | WO 2005/048577 | 5/2005 |
| WO | WO 2005/057968 | 6/2005 |
| WO | WO 2005/060292 | 6/2005 |
| WO | WO 2005/079087 | 8/2005 |
| WO | WO 2005/107195 | 11/2005 |
| WO | WO 2005/112410 | 11/2005 |
| WO | WO 2005/114918 | 12/2005 |
| WO | WO 2005/114920 | 12/2005 |
| WO | WO 2005/125233 | 12/2005 |
| WO | WO 2006/005999 | 1/2006 |

OTHER PUBLICATIONS

EP Examination Report dated Sep. 12, 2008 issued in EP 06 765 153.9-2412.

EP Examination Report dated Nov. 12, 2009 issued in EP 08 702 011.1-1525.

PCT International Search Report dated Feb. 21, 2007 issued in PCT/GB2006/002816.

PCT International Search Report dated Jun. 19, 2008 issued in PCT/GB2008/000344.

PCT International Search Report dated Nov. 7, 2008 issued in PCT/GB2008/000344.

PCT International Search Report and Written Opinion dated Nov. 8, 2006 issued in PCT/GB2006/002820.

(56) References Cited

OTHER PUBLICATIONS

PCT International Search Report and Written Opinion dated Nov. 10, 2006 issued in PCT/GB2006/002838.
PCT International Search Report and Written Opinion dated Feb. 23, 2007 issued in PCT/GB2006/002819.
PCT International Search Report and Written Opinion dated Feb. 28, 2007 issued in PCT/GB2006/002824.
UK Search Report dated Jun. 20, 2007 issued in GB0702093.6.
UK Search Report dated Sep. 11, 2007 issued in GB0702093.6.
UK Search Report dated Sep. 22, 2008 issued in GB0807815.6.
UK Search Report dated Jan. 5, 2006 issued in GB0515888.6.
UK Search Report dated Mar. 10, 2006 issued in GB0515888.6.
UK Examination Report dated Jul. 28, 2009 issued in GB0515888.6.
UK Examination Report dated Mar. 1, 2010 issued in GB0515888.6.
UK Search Report dated Jan. 31, 2007 issued in GB0625660.6.
UK Search Report dated Feb. 14, 2007 issued in GB0625662.2.
UK Search and Examination Report dated Mar. 1, 2010 issued in GB1001514.7.
UK Search and Examination Report dated Mar. 1, 2010 issued in GB1001515.4.
UK Search and Examination Report dated Jun. 3, 2010 issued in GB1001515.4.
UK Search and Examination Report dated Jun. 26, 2008 issued in GB0807816.4.
UK Search and Examination Report dated Jul. 2, 2008 issued in GB0807818.0.
UK Examination Report dated Jun. 17, 2008 issued in GB0807819.8.
UK Examination Report dated Mar. 26, 2009 issued in GB0807819.8.
UK Search Report dated Jan. 30, 2007 issued in GB0625661.4.
UK Search Report dated Feb. 13, 2007 issued in GB0625663.0.
UK Search and Examination Report dated Jul. 1, 2009 issued in GB0909125.7.
UK Search Report dated Sep. 14, 2006 issued in GB0610650.4.
UK Search Report dated Oct. 31, 2006 issued in GB0610650.4.
UK Search Report dated Jul. 7, 2008 issued in GB0610650.4.
U.S. Office Action dated Jul. 19, 2010, U.S. Appl. No. 11/801,423.
U.S. Office Action dated Mar. 29, 2011, U.S. Appl. No. 11/801,423.
U.S. Office Action dated Feb. 2, 2011, U.S. Appl. No. 12/862,523.
JP Office Action dated Oct. 1, 2010, issued in JP 2008-524575.
UMA Architecture (Stage 2) R1.0.4 (May 2, 2005).
Mouly, M. et al., "Mobility and Security Management," GSM System for Mobile Communications, Lassay-Les-Chateaux, Europe Media, FR, 1993, pp. 432-498.
ETSI Standards, "Digital Cellular Telecommunications System," ETSI TS 143 318, European Telecommunications Standards Institute, Sophia-Antipo, FR, vol. 3-G1, No. V6.2.0, Jun. 2005.
ETSI Standards, "Digital Cellular Telecommunications System," ETSI TS 123 122, European Telecommunications Standards Institute, Sophia-Antipo, FR, vol. 3-CN1, No. V6.5.0, Jun. 2005.
Johanson et al., "Mobile Advantage Wireless Office—A Digital Wireless Office System for TDMA/136 Networks," Ericsson Review, Ericsson, Stockholm, SE, vol. 1, 1999, pp. 20-27.
U.S. Office Action dated Sep. 14, 2011, U.S. Appl. No. 11/664,361.
U.S. Office Action dated Sep. 7, 2011, U.S. Appl. No. 12/862,523.
CN Office Action dated Jan. 25, 2011, Application No. 200680036431.7.
CN Office Action dated Nov. 10, 2011, Application No. 200880010299.1.
EP Extended Search Report dated Nov. 4, 2011, EP 10184587.3.
EP Extended Search Report dated Feb. 3, 2012, EP10184563.
Extended European Search Report dated Jan. 12, 2012, Application No. 11188897.0.
Extended European Search Report dated Jan. 30, 2012, Application No. 11188896.2.
JP Office Action dated Sep. 16, 2011, issued in JP 2008-524575.
U.S. Final Office Action dated Jun. 12, 2012, U.S. Appl. No. 11/664,361.
U.S. Office Action dated Mar. 27, 2012, U.S. Appl. No. 12/862,523.
U.S. Office Action dated Jul. 17, 2012, U.S. Appl. No. 11/801,423.
Second EP Examination Report dated Jul. 31, 2012, Application No. 06 765 137.2-2412.
JP First Office Action dated May 21, 2012, JP Application No. 2009-547763.
JP Final Office Action dated Sep. 14, 2012, Application No. JP 2008-524575.
U.S. Final Office Action dated Nov. 29, 2012, U.S. Appl. No. 12/862,523.
U.S. Office Action dated May 9, 2013, U.S. Appl. No. 11/801,423.
CN Office Action dated Oct. 31, 2012, in Application No. 200880010299.1.
EP Search Report dated May 22, 2013 in EP Application No. 10184610.3.
3Way Networks 3Way DBX Datasheet—3Way Networks Announces First In-C Technology Product (DBX6750), Mar. 19, 2005 (K8a).
ETSI TR 125 933 V5.4.0 (2003-12) (extract), University Mobile Telecommunications System (UMTS): IP transport in UTRAN (3GPP TR 25.933 version 5.4.0 Release 5), pp. 1-16 & 118, (K10).
ETSI TR 125 933 V5.4.0 (2003-12) (extract), University Mobile Telecommunications System (UMTS): IP transport in UTRAN (3GPP TR 25.933 version 5.4.0 Release 5), p. 119, (K10a).
ETSI TS 125 414 V5.0.0 (2002-03) (extract), University Mobile Telecommunications System (UMTS): UTRAN Iu Interface data transport and transport signalling (3GPP TS 25.414 version 5.0.0 Release 5), pp. 1-19, (K11).
ETSI TS 123 002 v3.4.0 (2000-12) (extract), Digital cellular telecommunications system (Phase 2+) GSM; University Mobile Telecommunications System (UMTS); Network architecture (3GPP TS 23.002 version 3.4.0 Release 1000), pp. 1, 16-17 & 22, (K13).
Ip.access press release, "ip.access introduces GSM 900 picocellular basestation", Feb. 15, 2005 (K14a).
Ip.access press release, "BT chooses ip.access for in-building GSM service offering", Nov. 18, 2004 (K14a).
Ip.access Datasheet—nanoBTS GPRS/GSM (2005) (K14b).
U.S. Office Action dated Jun. 27, 2013, U.S. Appl. No. 11/664,361.
Non-final Office Action dated Jun. 28, 2013, U.S. Appl. No. 12/862,523.
CN Office Action dated Jun. 18, 2013, in Application No. 200880010299.1.
JP Office Action dated Jul. 29, 2013 in Application No. 2012-061034.
ETSI TS 123 002 V3.4.0 (2000-12), "Digital Cellular Telecommunications System (Phase 2+) (GSM); Universal Mobile Telecommunications System (UMTS); Network Architecture," 3GPP TS 23.002 version 3.4.0 Release 1999, pp. 16 & 17 and 22 (K15).
ETSI EN 302 405 V.7.1.1 (2000-08), "Digital Cellular Telecommunications System (Phase 2+); GSM Cordless Telephony System (CTS), Phase 1; CTS Architecture Description; Stage 2," GSM 03.56 version 7.1.1 Release 1998 (K16a).
ETSI EN 302 404 V.8.0.1 (2000-09), "Digital Cellular Telecommunications System (Phase 2+); GSM Cordless Telephony System (CTS), Phase 1; Lower Layers of the CTS Radio Interface; Stage 2," GSM 03.52 version 8.0.1 Release 1999 (K16b).
Bhatia et al., VOIP: An In-Depth Analysis, Cisco Press, Oct. 20, 2005, 15 pages.
UMA Architecture (Stage 2) R1.0.1 (2004-10-08), pp. 15-16 & 20.
Rosenberg et al., SIP: Session Initiation Protocol Memo, 2002.
Hoene et al., A Perceptual Quality Model for Adaptive VoIP Applications, Proceedings of International Symposium on Performance Evaluation of Computer and Telecommunication Systems (SPECTS'04), San Jose, CA, Jul. 2004 (11 pages).
Johanson et al., Mobile Advantage Wireless Office—A digital wireless office system for TDMA/136 networks, Ericsson Review No. 1, 1999, pp. 20-27.

(56) References Cited

OTHER PUBLICATIONS

DE Patent Office Action DE 20 2006 020 958.1, Reply to Cancellation Request filed by Respondent Ubiquisys Jul. 30, 2012 (in German and translation).
DE Patent Office Action DE 20 2006 020 957.3, Reply to Cancellation Request filed by Respondent Ubiquisys Jun. 21, 2012 (in German and translation).
DE Patent Office Action DE 20 2006 020 958.1, Reply filed by Respondent Ubiquisys Apr. 22, 2013 (in German and translation).
U.S. Notice of Allowance dated Oct. 8, 2013, U.S. Appl. No. 11/664,361.
U.S. Notice of Allowance dated Nov. 15, 2013, U.S. Appl. No. 12/862,523.
DE Patent Office Action DE 20 2006 020 957.3, Paper filed on Oct. 9, 2013 by Ubiquisys (in German and translation).

* cited by examiner

SELF-CONFIGURING CELLULAR BASESTATION

CROSS-REFERENCE TO RELATED APPLICATIONS

This application is a divisional of U.S. application Ser. No. 11/664,361, filed Dec. 26, 2007, which is a 371 of PCT/GB06/02816, filed Jul. 28, 2006, which claims priority from GB Application No.0515888.6, filed Aug. 1, 2005, each of which is incorporated herein by reference in their entirety for all purposes. The present application claims priority to and benefit of each of these applications.

This invention relates to a cellular basestation, and in particular to a basestation for a cellular communications network, that can conveniently be used to provide a cellular service, for example within a home or office.

Wide area cellular services for standards such as GSM and UMTS are provided from conventional basestations which are capable of covering a large area (cell radius of many kilometres). However, coverage within buildings can be more challenging because of the RF attenuation of the building structure and radio shadowing effects from surrounding buildings. This coverage problem becomes more difficult for standards aiming to support medium to high speed data such as EDGE and UMTS because of the higher signal-to-noise figures required for signals using high-order constellations or low spreading factors. Higher frequencies such as those used for UMTS also accentuate the problem because these signals suffer greater attenuation through building structures.

Conventional solutions to these problems would be to deploy many more basestations and RF repeater systems to increase coverage within buildings and urban areas. These solutions become prohibitively costly and the additional aesthetic impact of many more basestations/aerials in populated areas creates objections from residents and additional legal expenses for operators. The use of short-range radio interfaces such as WiFi or Bluetooth to handle cellular traffic within a home or office is an alternative approach, but requires the customer or operator to invest in new handsets which on a large scale becomes a major expense in itself.

Recent figures suggest over 70% of all cellular calls are made within buildings so this issue presents some significant obstacles to the future growth of the cellular industry.

According to a first aspect of the present invention, there is provided a basestation, for use in a cellular communications system, comprising:
  a radio frequency receive path;
  a radio frequency transmit path; and
  a connection for a network;
  wherein, on installation, the basestation is adapted to:
  configure the radio frequency receive path to operate in a wireless communications network;
  monitor received signal strengths on each of a predetermined plurality of network carriers;
  select, on the basis of said received signal strengths, a first of said predetermined plurality of network carriers as an operating downlink carrier; and
  select, on the basis of the received signal strength of said selected first of said predetermined plurality of network carriers, an initial power level for said radio frequency transmit path; and
  wherein the basestation is further adapted to operate using said operating downlink carrier and a corresponding operating uplink carrier, following said installation.

According to a second aspect of the present invention, there is provided a basestation, comprising:
  radio transceiver circuitry, for connection to wireless communications devices by means of a cellular wireless communications protocol; and
  an interface, for connection over an IP network;
  wherein the basestation is adapted to communicate using UMA standard protocols over said IP network with a UMA network controller, in order to provide communications with said wireless communications devices by means of said cellular wireless communications protocol.

According to a third aspect of the present invention, there is provided a basestation, for use in a cellular communications network, wherein the basestation is operable such that only specific preconfigured mobile stations are able to connect to said network by means of the basestation.

According to a fourth aspect of the present invention, there is provided a telecommunications network, comprising:
  a plurality of basestations, each having a respective connection to a cellular wireless communications network, and each having a respective connection to an IP network;
  wherein a mobile communications device, active in said wireless communications network, can perform a handover from one of said basestations to another of said basestations, without requiring intervention of said cellular network.

BRIEF DESCRIPTION OF THE DRAWINGS

FIG. 1 illustrates a communication system 100, incorporating a basestation 110 in accordance with the present invention. In this exemplary embodiment, the basestation 110 is intended to provide coverage within a building, such as a home or office 120, for voice and data services using both GSM/GPRS and UMTS air interfaces within existing cellular communications networks, allowing the use of existing cellular mobile phones 122, without the need for significant modification. As described in more detail below, the basestation 110 also provides flexible interfacing to the network operator's core network 130 via the Unlicensed Mobile Access (UMA) or Session Initiation Protocol (SIP) standards, as opposed to the usual Iub (UMTS) or Abis (GSM) interfaces used by conventional cellular basestations. Backhaul from the basestation units, referred to as ZoneGates, is achieved through the use of Digital Subscriber Line (DSL) connections 140 over the home or office fixed line phones; this approach enables low-cost transport of data and voice using Voice-over-Internet Protocol (VoIP) techniques.

FIG. 2 is a block schematic diagram, illustrating in more detail aspects of the hardware architecture of the basestation 110.

Figure 1:
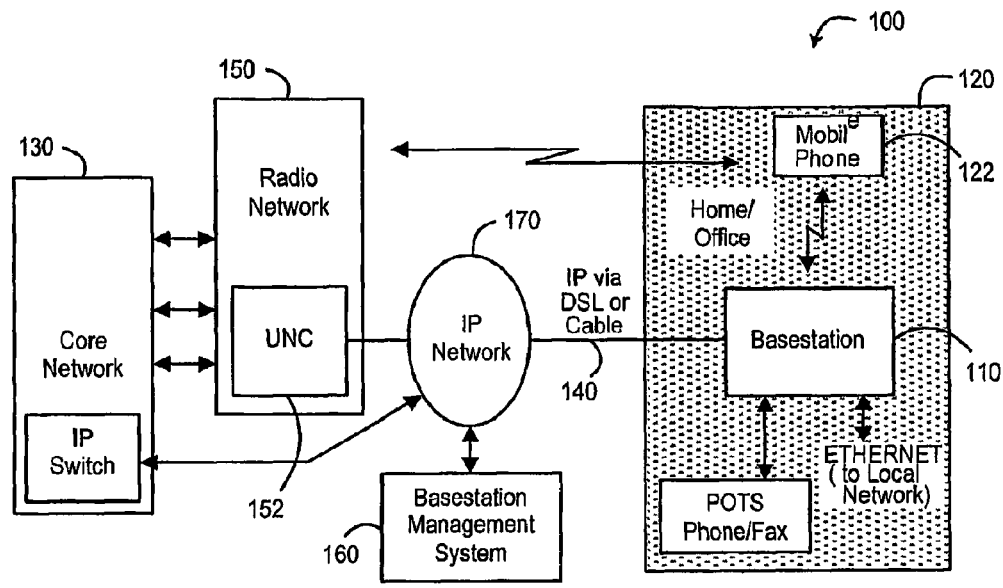
FIG. 1 is a block diagram of a communications system including a basestation in accordance with the present invention.

The architecture consists of a number of functional blocks interconnected by a processor bus 202 such as the ARM AMBA bus. The major blocks are described below.

Firstly, the basestation 110 supports various external wired interface, as described below.

The basestation 110 preferably includes an internal ADSL modem/router 204. Router functionality will include NAT and DHCP server.

USB 1.1 interface 206. In the absence of an internal ADSL modem/router this USB interface 206 will support connection to an external DSL modem. If the internal ADSL modem 204 is incorporated, the USB interface 206 provides a connection to a local PC for broadband internet service and advanced configuration/control of the basestation 110.

Figure 2:
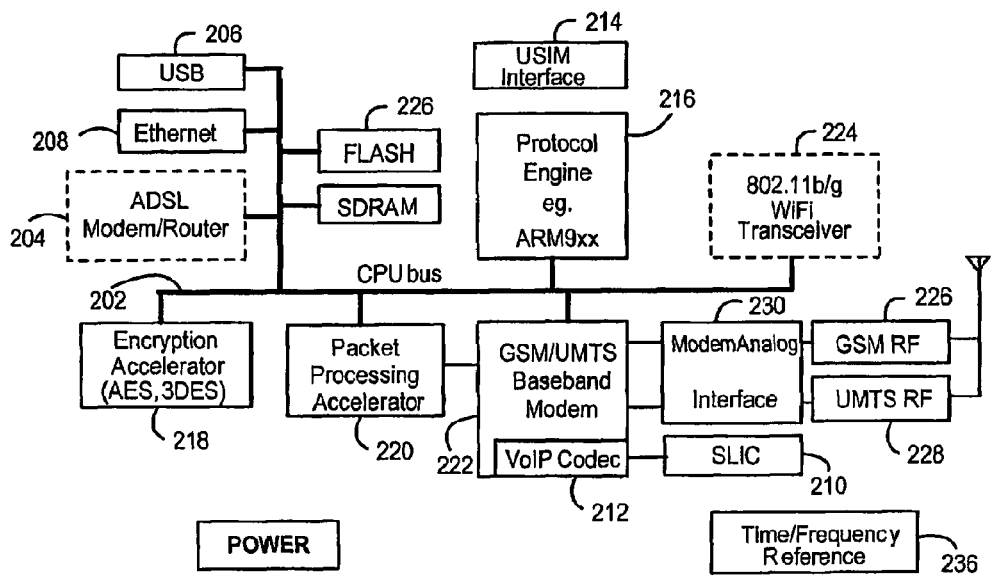
FIG. 2 is a block diagram of the hardware architecture of a basestation in accordance with the present invention.

RJ45 Ethernet 10/100/1000 interface 208. This interface provides connection to an external local area (for example, home or office) network (not shown in FIG. 2) for advanced configuration/control of the basestation 110 and allowing basestation access to external devices for advanced service provision. With the internal DSL modem 204 included, the Ethernet port 208 is used for broadband Internet service as a more flexible alternative to the USB port 206.

As described in more detail below, multiple basestation units 110 installed in a large indoor area and connected to a common Ethernet LAN can manage handovers between themselves without the intervention of other systems in the operator's radio network 150 or core network 130.

RJ11 Standard Pots Telephone Connection. POTS phone and fax services are supported via a RJ11 phone connector. A SLIC device 210 driving the connector is preferably configurable to support a number of national standards, for example including UK, Germany, France, Italy, Spain, Japan and USA. Voice service is provided via VoIP using appropriate standard codecs 212. Analogue fax service is also supported. This port will not provide line power.

USIM interface 214. The basestation 110 will have provision for a Subscriber Identification Module (SIM) card interface to allow use of a standard SIM card to identify the unit uniquely to the Management System 160 and the network operator's radio network 150 and core network 130, and hence enable certain services, as described in more detail below.

The basestation 110 includes a Protocol Engine 216 implemented as a small embedded CPU such as an ARM926 (with appropriate peripherals) supported by dedicated co-processors 218, 220 respectively for Encryption and Packet Processing which will offload the main CPU for specific intensive tasks. Protocols implemented on the Protocol Engine 216 include:

Session Control, Including Web Server, DHCP Server and OSGi Server;
GSM/UMTS Access Stratum (NAS) Functions;
GERAN Access Stratum Functions;
UMA Client; and
SIP Client.

The Packet Processing Accelerator 220 handles formatting of the packets flowing to/from the GSM/GPRS Layer 1 functions implemented in the Baseband Modem 222, and formatting of the packet streams to/from the UMTS Layer 1 functions implemented in the Baseband Modem 222. The Packet Processing Accelerator 220 also formats VoIP packets to/from the POTS interface. VoIP codec functions are supported by the Baseband Modem 222.

Encryption of the IPSec packet payload is handled by the Encryption Accelerator 218. AES and 3DES encryption protocols will be supported. Only the ZoneGate's VPN connection to UNC/Management System will make use of the internal encryption processing; user VPN encryption processing will be handled outside the basestation 110.

The main CPU 216 is also responsible for the configuration and control, via the main CPU bus 202, of all functional blocks in the system including the Baseband Modem 222, USB port 206, Ethernet port 208, and, optionally, the ADSL modem/router 204 and a WiFi transceiver 224. The system software image, including configuration data for all system functional blocks is stored in FLASH memory 226 within the basestation 110; two complete system images are stored so that updated system images can be downloaded to the basestation 110 from the Management System 160, whilst the previous image is retained as a fall back option in case of corrupted download.

The main CPU peripherals include:
Watchdog timers for software sanity checking;
JTAG and serial ports for in-system debug; and
GPIO for system control including LED status indication, system power management and system alarm gathering.

The basestation 110 supports sample rate processing, chiprate processing (UMTS only) and symbol rate processing for GSM and UMTS basestation modems, and supports simultaneous GSM and UMTS operation. Limited GSM Mobile Station (MS) and UMTS User Equipment (UE) modem functionality will also be implemented to allow the basestation 110 to recover the Broadcast Channel (BCH) from local GSM/UMTS basestations and other nearby similar basestations 110. UE modem mode will be entered during initial installation to survey the local RF environment and at regular intervals after the initial installation to monitor the RF environment and, if necessary, modify the configuration of the basestation 110.

The DSP functionality included in the Baseband modem 222 is also used for VoIP codec implementation.

The baseband modem is implemented using a software-based architecture to ensure high adaptability of the modem over a field life of at least 5 years. The performance of the GSM and UMTS basestation modems is adequate for stationary or pedestrian users moving at no more than 10 kmh within a radius of 50 m from the basestation 110. The Baseband Modem 222, being software based, is upgradeable to allow future enhancement to HSDPA or EDGE service to be delivered in the field without the need to replace the unit.

The basestation 110 has GSM RF circuitry 226 and UMTS RF circuitry 228, each connected to the baseband modem 222 through a modem-analog interface 230, to support simultaneous operation of GSM at either 900 MHz or 1800 MHz and UMTS at 2100 MHz. For the GSM and UMTS receive paths both uplink (basestation receive) and downlink (terminal receive) frequencies are accessible; for the transmit paths only downlink (basestation transmit) frequencies are available. At installation the basestation 110 selects a downlink RF carrier frequency with lowest noise/interference for both GSM and UMTS from a permitted list of GSM and UMTS carrier frequencies provided by the Management System 160; permitted downlink frequencies will be scanned by the basestation 110 with its receive path configured in UE mode and its transmit path disabled.

The basestation 110 is designed to provide cellular service over a distance of 50 m or less to stationary or pedestrian users within a building, hence the transmit power required is dramatically reduced compared to a conventional basestation.

The basestation 110 includes timing and frequency references 236 which provide sufficient accuracy for GSM and UMTS basestation operation over a 5 year lifetime.

The basestation 110 therefore provides a services platform which can exploit the potential of the union of three data networks within the basestation 110, namely the external core network (via DSL), mobile devices (via GSM/UMTS) and the home network (via Ethernet).

Figure 3:
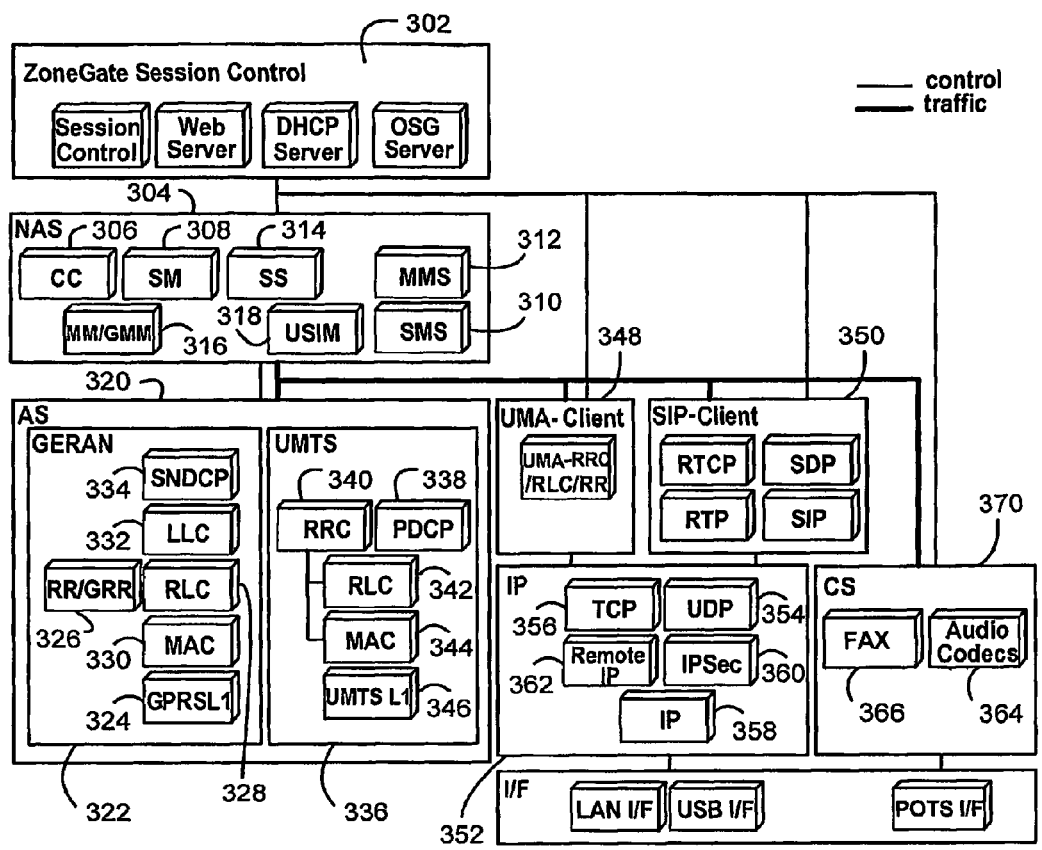
FIG. 3 is a block diagram of the software architecture of a basestation in accordance with the present invention.

FIG. 3 illustrates the major components of the protocol software architecture implemented on the Protocol Engine CPU 216.

A basestation Session Control subsystem 302 manages and implements the service flows and policies that determine how the basestation 110 is set-up and functions for any particular Mobile Network Operator (MNO) configuration and end-user settings. Functions of the Session Controller include:

Implementation of the policies for registration, call control and traffic flow for the basestation on the MNO core network;

Control of the UMA and SIP clients for registration, call control and traffic flow;

Control of information flow with the network based Management System;

Management of the basestation Radio Access Network (RAN) resources for mobile registration and call handoff;

Control and execution of the MNO and end-user provisioning methodologies;

Management of the basestation Packet Core policies; and

Handling of Java based application requests for network resources.

The Non-Access Stratum 304 functionality is required in order for services to be provided to the UE when the MNO GSM/UMTS core-network is not connected to the basestation, which would typically be the case for basestations connecting over SIP. This functionality enables the basestation 110 to offer the usual GSM/UMTS services such as SMS and MMS which mobile users are accustomed to, whilst not being connected to the GSM/UMTS core network 130. In order for such services to be offered, the basestation 110 contains a condensed subset of the core-network functions usually contained in the Mobile Switching Centre (MSC), Serving GPRS Service Node (SGSN), GSM Basestation Subsystem (BSS), and UMTS Radio Network Subsystem (RNS).

The Non-Access Stratum 304, as implemented in the basestation 110, comprises the following functions:

Call Control (CC) 306—supports call establishment between two peer entities, mainly for circuit-switched connections. For the basestation, also provides the mapping between SIP call establishment and circuit-switched voice call over GSM and UMTS.

Session Management (SM) 308—Control of packet data sessions.

Short Message Service server (SMS) 310—transmission of SMS messages between the basestation 110 and the network SMS service centre.

MultiMedia Messaging Service server (MMS) 312—transmission of multimedia messages between the basestation UEs and the network MMS service centre.

Supplementary Services (SS) 314—implementation for services such as call waiting, call holding, and multi-party.

Mobility Management/GPRS Mobility Management (MM/GMM) 316—management of UE mobility elements, such as Location Registration, authentication, and ciphering.

USIM 318—control functions associated with the SIM card which may be fitted to the basestation 110.

The Access Stratum 320 comprises the lower-level functionality that is particular to GSM EDGE Radio Access Network (GERAN), and UMTS. The GERAN functionality is selected for GSM, GPRS and EDGE access, and UMTS functionality for UMTS-enabled services.

The GERAN access stratum functionality 322 comprises both BSS (Layer-1 324, Radio Resource 326, Radio Link Control 328/Medium Access Control 330) and SGSN (Link Layer Control 332 and Sub-Network Dependent Convergence Protocol 334) functionality. The BSS functionality is required for basestation support of all GSM/GPRS/EDGE services supporting regardless of the interface used between the basestation and the MNO core network. The SGSN functionality is required only when MNO GERAN core-network functionality is bypassed, for example for SIP and Internet-based services over GERAN.

The GERAN access stratum functionality 322 therefore comprises the following elements:

Sub-Network Dependent Convergence Protocol (SNDCP) 322—Multiplexing of several packet data protocols; data compression/decompression (optional); header compression/decompression (optional); segmentation and re-assembly.

Logical Link Control (LLC) 332—LLC provides peer-to-peer unacknowledged and acknowledged data transfer, and the GPRS ciphering functionality.

Radio Link Control/Medium Access Control (RLC/MAC) 328, 330—RLC/MAC supports acknowledged and unacknowledged modes; segmentation and reassembly of LLC PDUs; multiplexing to several physical channels; broadcast of system information.

Radio Resource Management (RR) 326—RR connection establishment, maintenance, and releases; system information broadcast; packet data resource management.

GSM/GPRS Layer 1 324—Interface to the GSM/GPRS/EDGE modem functions implemented in the Baseband Modem 222.

The UMTS Access Stratum functionality 336 comprises Radio Network Controller (RNC) functionality (Radio Resource Control, Packet Data Convergence Protocol, Radio Link Control/Medium Access Control) and interface to the UMTS physical layer implemented on the Baseband Modem 222. The RNC and physical layer interface functionality is required for all basestation services supporting UMTS regardless of the core network interface used.

The UMTS access stratum functionality 336 comprises the following elements:

Packet Data Convergence Protocol (PDCP) 338—Header compression and decompression of IP data streams (optional), transfer of user data, maintenance of PDCP sequence numbers.

Radio Resources Control (RRC) 340—Broadcast of information related to the NAS and AS; establishment, maintenance and release of RRC connections; establishment, reconfiguration and release of Radio Bearers and radio resources; RRC connection mobility functions; control of requested QoS; UE measurement reporting and control; outer loop power control; ciphering control.

Radio Link Control (RLC) 342—Transmission and reception of signaling and data packets, including buffering, segmentation and concatenation of packets. Comprises three entity types, for acknowledged mode, unacknowledged mode, and transparent modes.

Medium Access Control (MAC) 344—Mapping between logical channels and transport channels, selection of the appropriate Transport Formats for each Transport Channel, priority handling between UEs, multiplexing/demultiplexing of upper layer PDUs to/from transport block (sets) on common and dedicated transport channels.

UMTS Layer 1 346—Interface to the UMTS modem functions implemented on the Baseband Modem 222.

The software architecture shown in FIG. 3 also includes a UMA client 348. The basestation 110 uses the UMA protocol in a non-standard configuration. The standard UMA protocol is designed to enable a GSM MS or UMTS UE which includes a UMA client and an unlicensed spectrum air interface such as IEEE802.11b/g or Bluetooth to communicate with the GSM/UMTS core network using unlicensed spectrum. The implementation in the basestation according to the present invention uses the UMA client 348 as part of the network interface of a GSM/UMTS basestation so that UMA protocols developed to communicate with a GSM/UMTS core network via an Unlicensed Network Controller (UNC) can be used to manage calls handled by that basestation, including handover to/from the macro network.

The use of UMA in the basestation of the present invention is described in more detail later.

SIP Client 350. The basestation 110 maps the GSM/UMTS protocols onto the SIP-client protocol so that the standard GSM/UMTS mobile services are mapped by the basestation onto the corresponding SIP services. The approach removes the need for SIP protocols or SIP services to be present or implemented on the MS/UE. For example, a standard GSM/UMTS voice call is mapped to a VoIP SIP call in the basestation 110, which also includes the mapping of the additional signaling required in order to register the user in the SIP core-network, and to originate, terminate, and clear the voice call. The complete GSM/UMTS protocol stack, which includes the BSS/RNS, and MSC/SGSN functionality is required in the basestation in order to implement the GSM/UMTS signaling.

The software architecture shown in FIG. 3 also includes IP Transport Layers 352. The IP transport layers 352 contain the standard Internet protocols, such as UDP 354, TCP 356, and IPv4 358. Additional protocols are implemented in order for the basestation 110 to support the required signaling functionality. IPSec 360 is required in order to provide an encrypted and secure transmission medium between the basestation 110 and the core network 130, which is required to maintain the secure connection between the user mobile station 122 and the core network 130. This is particularly important as ciphering encryption is a standard feature for the GSM/UMTS air interface, and encryption is mandatory for the transfer of secure information such as security and ciphering keys between the basestation 110 and the core network 130. Remote IP 362 is implemented to enable user mobility within a packet network.

The software architecture shown in FIG. 3 also includes circuit-switched functionality 370, including a set of voice codecs 364 in order that a standard POTs connection (to a standard analogue telephone) can be made to the core network using SIP (VoIP). In addition, a Fax codec 366 enables the connection of a standard fax machine to the basestation 110 for the transmission and reception of faxes over the Internet again using SIP (FoIP).

The basestation 110 is a compact unit designed to be mounted on a table-top or internal wall or ceiling within the home or office. Unusually for a GSM/UMTS basestation, no cell planning is required to install the basestation 110 due the low transmit power levels and self-configuration for frequency/scrambling code.

Following physical installation, insertion of SIM card (if required) and connection of external DC power and network connection via DSL or cable the basestation 110 executes the following sequence of operations:

1. Establishes communications with the Basestation Management System 160, completes authentication with the Management System using data recorded in the SIM and downloads various configuration parameters including the "Permitted List" of carrier frequencies and UMTS scrambling codes that the mobile network operator providing the basestation service chooses to allow.
2. The RF receive path is configured to operate on the GSM mobile phone downlink frequencies so that surrounding GSM basestations (and other active basestations in accordance with the invention) can be detected and identified. The Baseband modem 222 is then configured as a GSM mobile phone baseband receiver such that the Synchronisation and Broadcast Channels transmitted by surrounding basestations can be fully demodulated and system information parameters recovered. The basestation 110 then monitors each of the GSM carrier frequencies in the Permitted List in turn measuring the signal strength of the basestation as a GSM mobile would in accordance with GSM standards. The signal strengths and Broadcast Channel information of the detected basestations is stored for future reference.
3. The RF receive path is configured to operate on UMTS downlink frequencies and the baseband modem is configured as a UMTS User Equipment capable of demodulating the Primary and Secondary Synchronisation channels (to determine scrambling code) and the Broadcast Channel so that System Info messages can be recovered. The basestation 110 then monitors each of the UMTS carriers and scrambling codes in the Permitted List in turn, measuring the Carrier to Interference ratio for each detected basestation (including other basestations in accordance with the invention) in the same way that a UMTS UE would. The C/I ratio and System Info data recovered for each detected basestation is stored for future reference.

4. The basestation 110 then selects the GSM carrier and UMTS carrier and scrambling code within the Permitted List with minimum received power from surrounding basestations (including other basestations in accordance with the invention) on the principle that these carriers will cause minimum interference to surrounding macrocells/microcells or other basestations in accordance with the invention. The RF transmit paths for GSM and UMTS are configured to the selected carrier frequencies and scrambling codes ready for operation. The basestation 110 RF receive paths are configured to monitor the uplink frequencies corresponding to the selected downlink carriers in accordance with the standardised pairing of downlink and uplink carrier frequencies in the GSM and UMTS Frequency Division Duplex schemes.

5. The basestation 110 then selects initial power levels for the GSM and UMTS transmit paths. An appropriate initial power level is deduced from the received signal strength/C/I detected by the basestation 110. The goal is that the transmitted power level is sufficient to provide cellular service at a distance of 20 m assuming the level of in-band interference created by surrounding basestations (including other basestations in accordance with the invention). Transmit Power is modified in call to maintain acceptable Quality of Service (QoS) in accordance with GSM and UMTS standards—the basestation 110 RF hardware imposes an upper limit on transmit power which is low enough to prevent the basestation 110 creating unacceptable interference in the event of a software malfunction.

6. The system information extracted from the broadcast channels of surrounding GSM and UMTS basestations is used to create a BA list for the GSM and UMTS Broadcast Channels transmitted by the basestation 110 in accordance with GSM and UMTS standards. This BA list identifies surrounding basestations which should be monitored by a mobile receiving the BA list in readiness for a handover should the signal level of the basestation 110, as received at the mobile, fall below acceptable limits. The BA lists for GSM and UMTS are reported back to the Management System 160.

7. The basestation 110 will begin transmission on the selected GSM and UMTS carriers at the initial power levels selected.

8. If the basestation 110 is part of a group of basestations in accordance with the invention, which share a common LAN connection and are able to handover to each other, then the BA list may be updated with information regarding other basestations within the group to allow a mobile to handover between such basestations, as described in more detail below.

The basestation unit 110 is designed to repeat the RF surveying process at regular intervals (every 1-10 days) following initial installation so that changes to the RF environment can be detected and previous decisions regarding carriers/scrambling codes can be re-evaluated if necessary.

Figure 4:
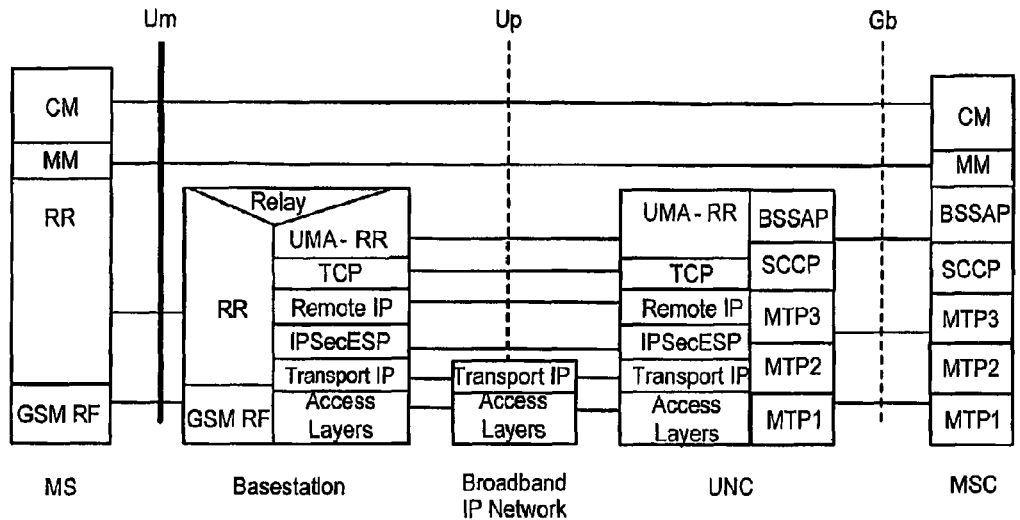
FIG. 4 illustrates a part of the protocol architecture of a system according to an aspect of the present invention.
Figure 5:
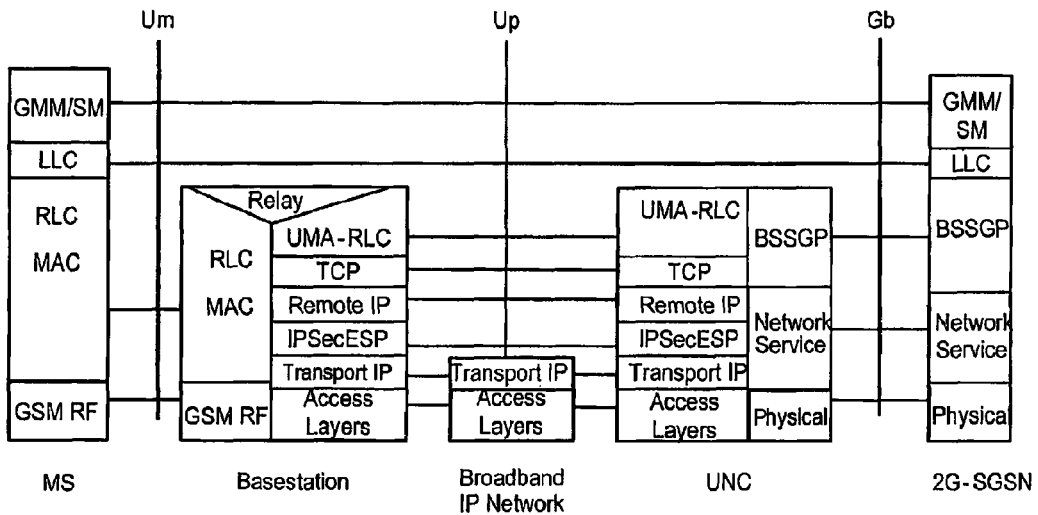
FIG. 5 illustrates a part of the protocol architecture of a system according to an aspect of the present invention.

As mentioned above, the basestation 110 uses the protocols defined for the UMA standard in a novel way to allow the basestation 110 to communicate over the broadband IP network 170 with a UMA UNC 152, and thereby provide communications between a mobile station (MS) 122 to GSM/UMTS radio networks 150 (to support seamless handoff) and core network 130 (to provide standard GSM/UMTS services). The basestation 110 software protocol stack maps the standard GSM/UMTS air-interface protocol to the UMA protocol, as shown in FIG. 4 for UMA-to-GSM, and FIG. 5 for UMA-to-GPRS For GSM (FIG. 4), the relay function within the basestation protocol stack maps the GERAN Radio Resources (RR) protocol directly to the UMA-RR protocol which is terminated in the UNC 152. The basestation 110 requires a full RR sub-layer implementation in order to communicate with the MS(s) 122 that are currently registered with the basestation. A subset of RR tasks are relayed to the UMA-RR sub-layer, in order to communicate with the core network (for example handovers).

For GPRS (FIG. 5), the basestation implements the RLC/MAC sub-layers in order to communicate with the registered MS(s) 122. The relay function within the basestation 110 maps the RLC/MAC sub-layers to the UMA-RLC sub-layer which is terminated in the UNC 152.

Figure 6:
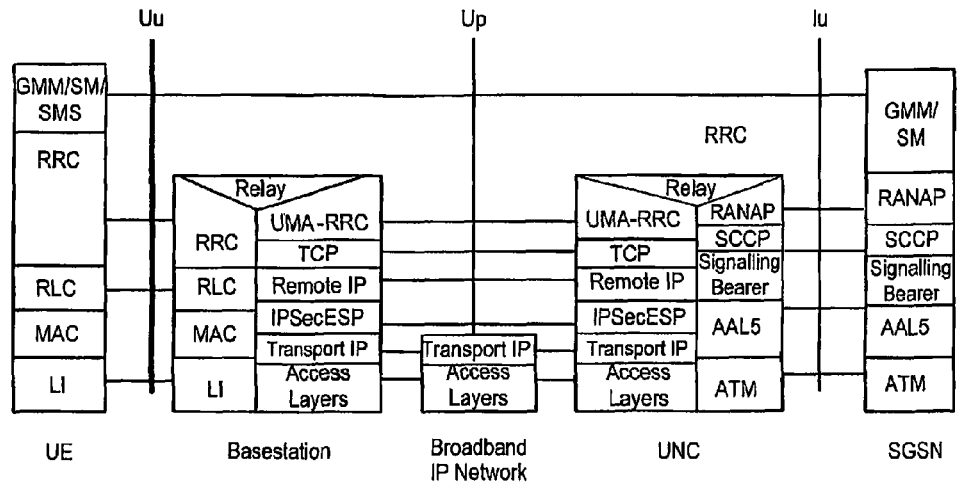
FIG. 6 illustrates a part of the protocol architecture of a system according to an aspect of the present invention.

The UMA-UMTS control plane is shown in FIG. 6. The basestation 110 implements the UMTS RRC, RLC, and MAC sub-layers, where ciphering is implemented in both RLC and MAC. The UMA-RRC sub-layer contains the additional UMTS related signaling. The UNC 152 can be extended to include an Iu interface which connects to the 3G-SGSN. The upper layers GMM, SM, and SMS are contained in the 3G-SGSN and communicate with their peers in the UE.

Figure 7:
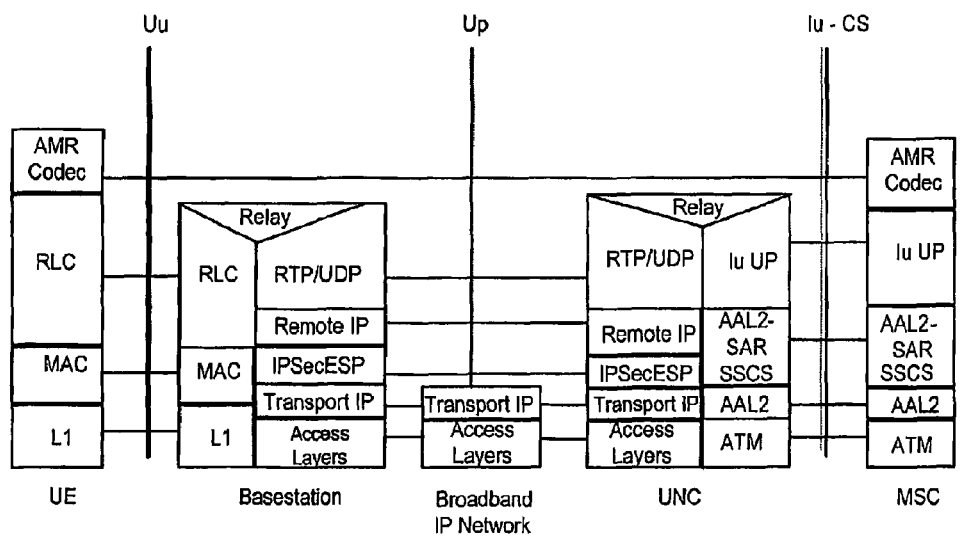
FIG. 7 illustrates a part of the protocol architecture of a system according to an aspect of the present invention.

For UMAN-UMTS voice (FIG. 7), the voice traffic is sent through the RLC and MAC sub-layers, where ciphering is performed in MAC. The voice traffic is transported using RTP/UDP between the basestation 110 and the UNC 152. The UNC 152 routes the voice traffic over Iu-CS to the 3G-MSC which contains the core network AMR codec.

Figure 8:
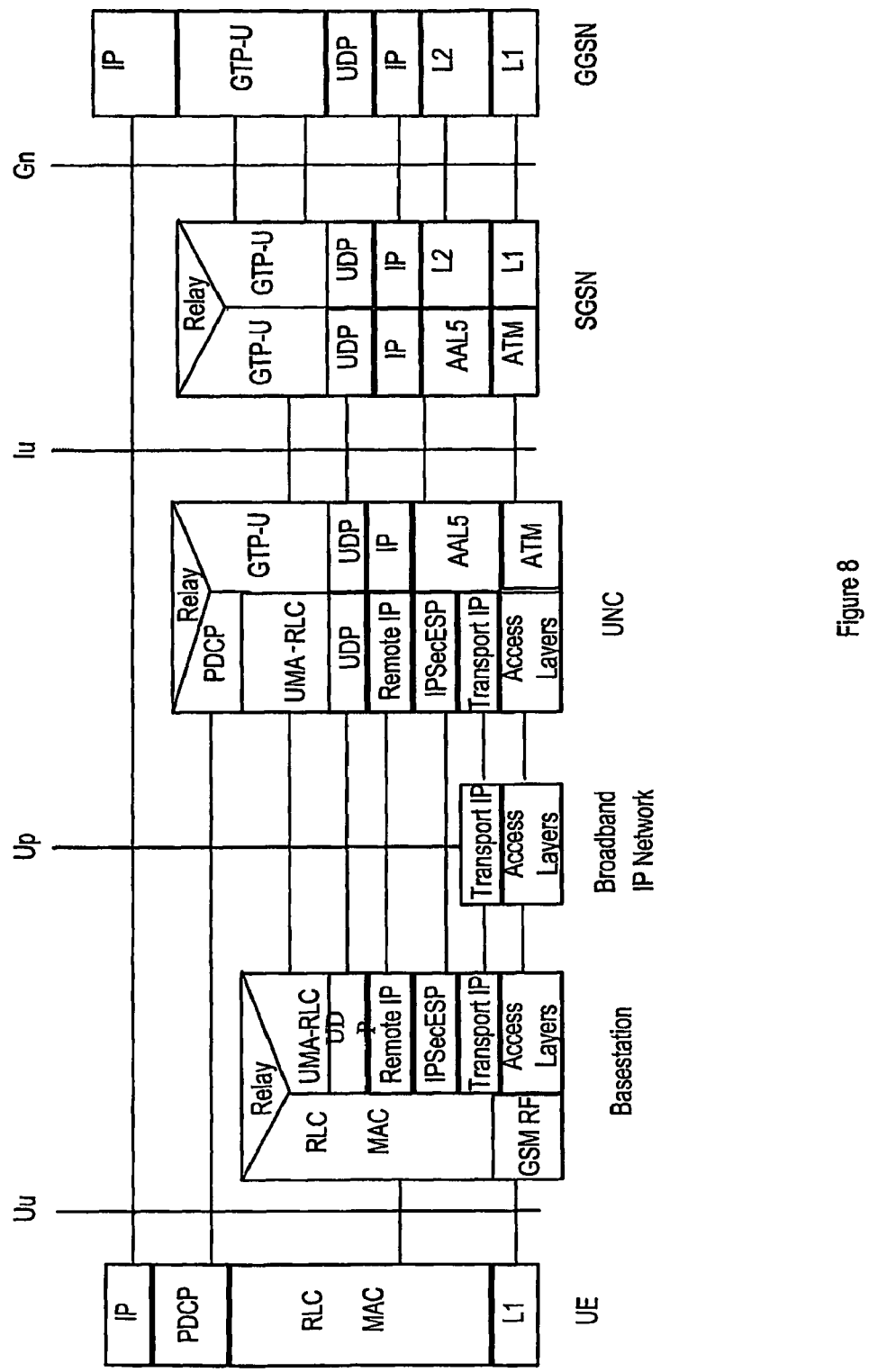
FIG. 8 illustrates a part of the protocol architecture of a system according to an aspect of the present invention.

For the UMAN-UMTS user plane (FIG. 8), IP user-data is transported via the PDCP, RLC, and MAC sub-layers to the basestation 110. The basestation implements the UMTS RLC and MAC sub-layers, where ciphering is implemented in the RLC sub-layer. The PDCP sub-layer might be moved to the basestation, rather than the indicated position in the UNC 152, but this is dependent on the future UNC implementation.

For GERAN ciphering, the ciphering keys and other information elements need to be transferred to the basestation 110 from the macro-core network 130, firstly in order that the CIPHERING MODE messages may be transmitted between the basestation 110 and the MS 122, and secondly in order that the basestation 110 GSM Layer 1 can cipher and de-cipher the subsequent control and user plane messages. The major requirement, and alteration to the UMAN protocol specification, is the requirement of the value of the cipher key Kc at the basestation 110, in order that the ciphering and de-ciphering of the GSM Layer 1 messages can be performed in the basestation. The value of Kc is proposed to be received in an additional message received from the UNC 152. The following two messages are therefore proposed as an extension to the standard UMA message set:

| Message Name | Description | Contents |
| --- | --- | --- |
| URR CIPHERING KEY REQUEST | Request by the basestation for the Ciphering Key to be sent by the network to the basestation. | None. |

-continued

| Message Name | Description | Contents |
| --- | --- | --- |
| URR CIPHERING KEY RESPONSE | Response from the network containing the ciphering key. | 1. 64-bit GSM ciphering key Kc.<br>2. A status word denoting whether the request was successful or failed. |

In the case of a GERAN to UMAN handover, the new value of Kc is contained in the GERAN A-HANDOVER REQUEST message sent from the MSC to the UNC 152, which is currently not passed to the MS 122 or basestation 110. The ciphering-related contents of the A-HANDOVER REQUEST message must be passed to the basestation in order to start ciphering once the handover is complete (if ciphering is active and enabled after handover).

In the case of a UMAN to GERAN handover, the value of Kc has already been passed to the basestation 110 (via the modified CIPHERING MODE COMMAND messages) during the UMAN ciphering configuration procedure. The value of Kc is passed to the target BSS via the A-HANDOVER REQUEST message from the MSC, therefore requiring no further modifications.

Figure 9:
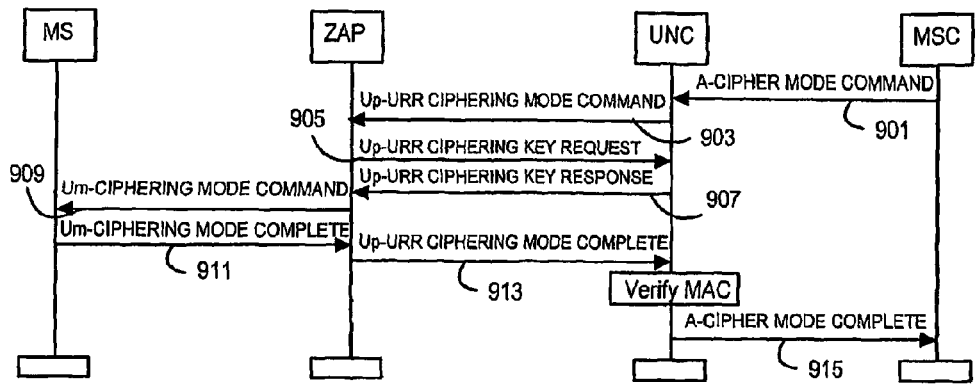
FIG. 9 illustrates a process according to an aspect of the present invention.

The ciphering configuration for GSM is performed as shown in FIG. 9 and as described in the sequence of steps below:

901. The core network 130 sends the BSSAP CIPHER MODE COMMAND to the UNC 152, which contains the GSM ciphering key Kc, and the encryption algorithm that the UNC (and MS) shall use.

903. The UNC 152 sends the URR-CIPHERING MODE COMMAND to the basestation 110, which indicates whether ciphering shall be started or not (after handover to GERAN), if so which algorithm to use, and a random number RAND. The message also indicates whether the MS shall include the IMEI in the URR CIPHERING MODE COMPLETE message.

905. The basestation 110 requests the value of the ciphering key Kc from the network by sending the proprietary URR-CIPHERING KEY REQUEST message, as described above.

907. The UNC 152 sends the value of the ciphering key in the URR-CIPHERING KEY RESPONSE message, as described above, to the basestation 110. The value of the ciphering key may only be sent by the UNC 152 if the basestation—UNC connection is encrypted. If the basestation is not allowed the value of Kc, or the link is not encrypted, or the current request was invalid, the response message shall contain no ciphering key, with the status set to "Invalid ciphering key", otherwise the status shall be set to "Valid ciphering key".

909. The basestation generates and sends the CIPHERING MODE COMMAND to the MS 122, indicating whether ciphering is enabled or not, and if so which algorithm to use. The contents of this message are based on the URR CIPHERING MODE COMMAND.

911. The MS 122 returns the CIPHERING MODE COMPLETE message, optionally containing the International Mobile Equipment Identity (IMEI).

913. A Message Authentication Code (MAC) is calculated by the basestation 110, from the input values of RAND, Kc, IMSI, using the HMAC-SHAI-96 algorithm, and returned together with the IMEI if indicated, in the URR CIPHERING MODE COMPLETE message.

915. The UNC 152 verifies the MAC. If the UNC verifies the MAC to be correct it sends the CIPHER MODE COMPLETE message to the core network 130.

For UMTS ciphering, the ciphering keys and other information elements are to be transferred to the basestation from the macro-core network in order that firstly the SECURITY MODE messages may be transmitted between the basestation and the UE 122, and secondly in order that the basestation UMTS Layer 2 can cipher and de-cipher the subsequent control and user plane messages. The major requirement, and alteration to the UMAN protocol specification, is the presence of the values of the UMTS Cipher Key CK and the UMTS Integrity Key IK at the basestation, in order that the ciphering and de-ciphering can be performed in the basestation. The values of CK and IK is proposed to be received in an additional message received from the UNC. The following two messages are therefore proposed as extensions to UMA:

| Message Name | Description | Contents |
| --- | --- | --- |
| URR SECURITY KEY REQUEST | Request by the basestation for the Ciphering Key CK and the Integrity Key IK to be sent by the network to the basestation. | None. |
| URR SECURITY KEY RESPONSE | Response from the network containing the ciphering key and the integrity key. | 1. 128-bit UMTS Ciphering Key CK.<br>2. 128-bit UMTS Integrity Key IK.<br>2. A status word denoting whether the request was successful or failed. |

In the case of a UMTS to UMAN handover, the new values of CK and IK are contained in the Iu-RELOCATION REQUEST message sent from the 3G-SGSN to the UNC, which are currently not passed to the UE or basestation. The ciphering-related contents of the Iu-RELOCATION REQUEST message must be passed to the basestation in order to start ciphering once the handover is complete (if ciphering is active and enabled after handover).

In the case of a UMAN to UMTS handover, the values of CK and IK have already been passed to the basestation (via the modified SECURITY MODE COMMAND messages) during the UMAN ciphering configuration procedure. The values of CK and IK are passed to the target RNS via the Iu-RELOCATION REQUEST message from the 3G-SGSN, therefore requiring no further modifications.

Figure 10:
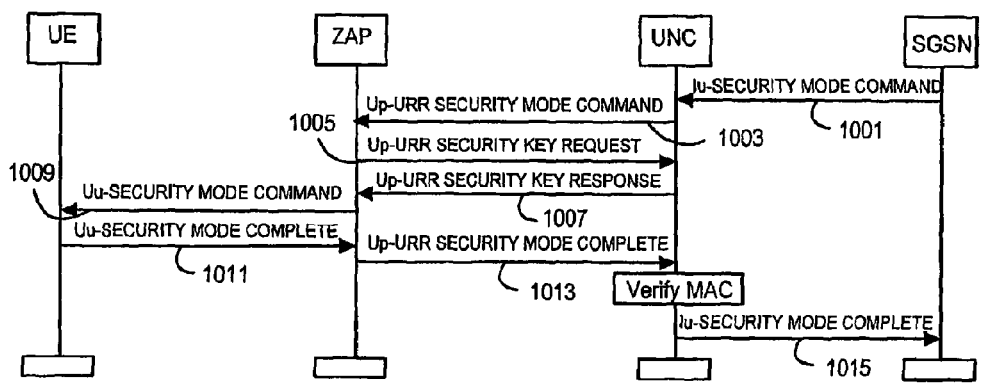
FIG. 10 illustrates a process according to an aspect of the present invention.

The UMTS ciphering configuration is performed as shown in FIG. 10 and in the sequence of steps below:

1001. The core network 130 sends the RANAP SECURITY MODE COMMAND to the UNC 152, which contains the UMTS Ciphering Key CK and the UMTS Integrity Key IK, and the encryption algorithm(s) that the UNC (and UE) shall use.

1003. The UNC 152 sends the URR—SECURITY MODE COMMAND to the basestation 110, which indicates whether ciphering shall be started or not (after handover to UMTS), if so which algorithm to use, a random number RAND, and Authentication Token AUTH. The message also indicates whether the UE shall include the IMEI in the URR SECURITY MODE COMPLETE message.

1005. The basestation 110 requests the values of the UMTS Ciphering Key CK and UMTS Integrity Key IK from the network by sending the proprietary URR—SECURITY KEY REQUEST message, as described above.

1007. The UNC 152 sends the value of the ciphering key in the URR—SECURITY KEY RESPONSE message, as described above, to the basestation 110. The value of the ciphering key may only be sent by the UNC if the basestation—UNC connection is encrypted. If the basestation is not allowed the values of CK and IK, or the link is not encrypted, or the current request was invalid, the response message shall contain no ciphering key, with the status set to "Invalid ciphering key", otherwise the status shall be set to "Valid ciphering key".

1009. The basestation 110 generates and sends the SECURITY MODE COMMAND to the UE 122, indicating whether ciphering is enabled or not, and if so which algorithm to use. The contents of this message are based on the URR SECURITY MODE COMMAND.

1011. The UE 122 returns the SECURITY MODE COMPLETE message, optionally containing the IMEI.

1013. A MAC is calculated by the basestation 110, from the input values of RAND, CK, IK, and IMSI, using the HMAC-SHAI-96 algorithm, and returned together with the IMEI if indicated, in the URR SECURITY MODE COMPLETE.

1015. The UNC 152 verifies the MAC. If the UNC verifies the MAC to be correct it sends the SECURITY MODE COMPLETE message to the core network 130.

The basestation 110 maps all UMA procedures to GSM/UMTS procedures, and vice-versa. This mapping is outlined in the following sub-sections.

Discovery and Registration Procedures

Figure 11:
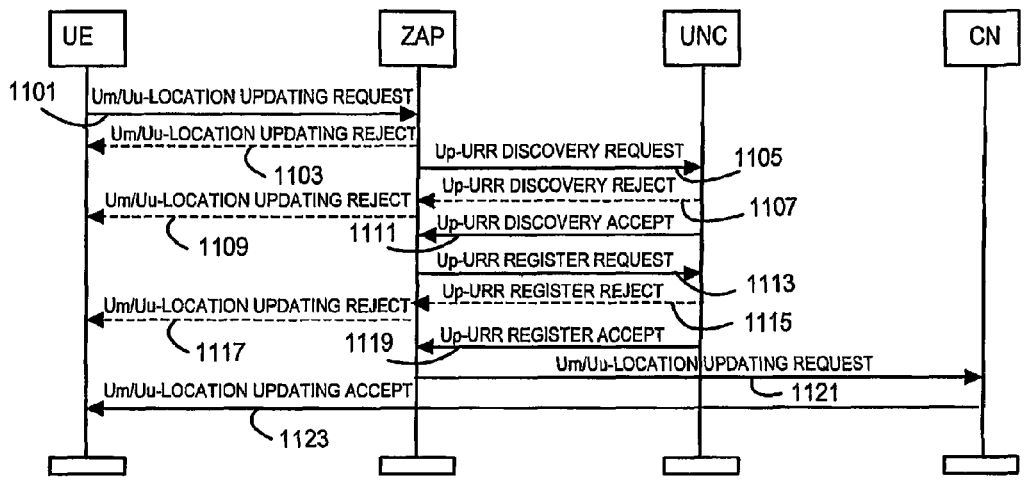
FIG. 11 illustrates a process according to an aspect of the present invention.

The UMA discovery and registration procedures as shown in FIG. 11 are performed when a suitable mobile station selects the basestation 110 through the GSM/UMTS PLMN selection and cell selection procedures. The mobile station may also be performing a PLMN re-selection which is mapped to the UMA rove-in procedure. The sequence shown in FIG. 11 assumes the UE 122 has no active voice or packet sessions active on the GERAN (i.e. in idle mode). The UE 122 may be IMSI and/or GPRS attached on the GSM or UMTS networks. The discovery and registration procedure is the same for both GSM and UMTS.

The following sequence of steps is executed:

The UE performs the Location Registration procedure by sending a LOCATION UPDATING REQUEST 1101 over the Um or Uu interface that also contains the IMSI of the UE. The basestation may reject the LOCATION UPDATING REQUEST early by sending a LOCATION UPDATING REJECT 1103 if the UE 122 is not registered with the basestation 110, due to an invalid IMSI.

The basestation 110 performs the UMAN discovery and registration procedures 1105 and 1113 in order to inform the UNC that a particular UE is available at a particular basestation. The UNC keeps track of this information for the purposes of providing services (for example mobile-terminated calls).

If the discovery or registration is rejected by the UNC (messages 1107 or 1115), the ZoneGate generates a LOCATION UPDATING REJECT (1109 or 1117) and sends it to the mobile.

On successful registration (messages 1111 or 1119), the basestation 110 transfers the original LOCATION UPDATING REQUEST to the core network SGSN (message 1121).

The core network 130 performs the authentication and ciphering procedures during the Location Registration in order to authenticate the UE 122 with the core network and to set-up the ciphering parameters prior to the commencement of ciphering. The core network indicates a successful Location Registration by sending the LOCATION UPDATING ACCEPT message 1123 to the UE. The UE has now registered with the core network and has successfully camped onto the basestation cell.

Deregistration Procedure

Figure 12:
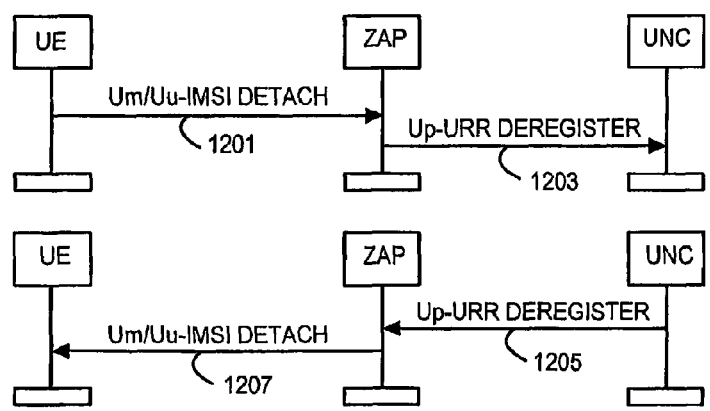
FIG. 12 illustrates a process according to an aspect of the present invention.

The Deregistration procedure is illustrated in FIG. 12. The IMSI DETACH 1201 may be originated from the mobile and sent to the basestation 110, where it is mapped to the URR Deregister 1203 and sent to the UNC. The URR DEREGISTER message 1205 may also be originated from the UNC and sent to the basestation 110, where it is mapped to the IMSI DETACH 1207, which is sent from the basestation to the mobile 122. The deregistration procedure is the same for both GSM and UMTS.

Mobile Originated Speech Call Procedure

Figure 13:
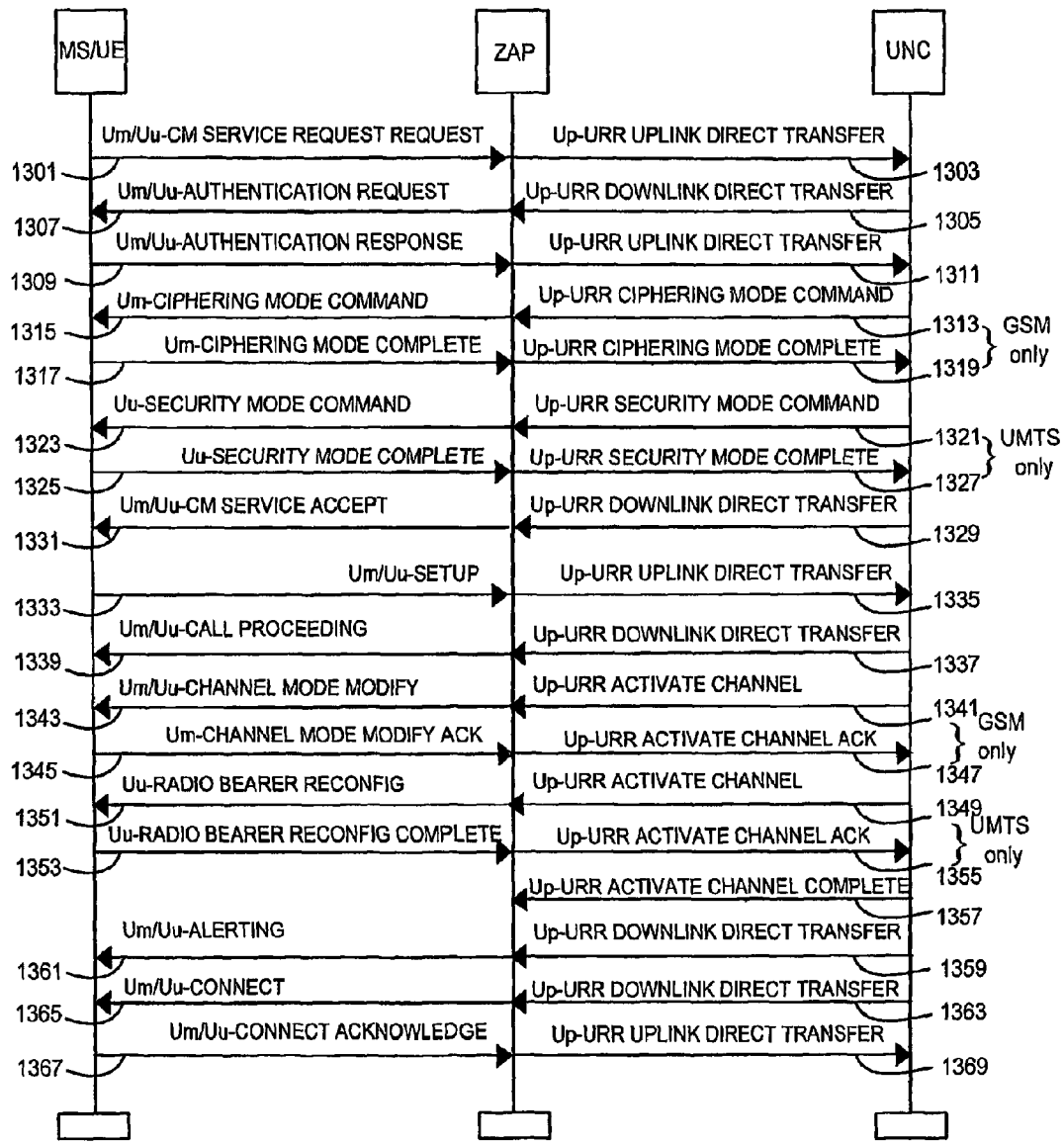
FIG. 13 illustrates a process according to an aspect of the present invention.

The mobile originated speech call procedure shown in FIG. 13 implements the standard GSM signalling between the basestation and the MS 122, which are mapped to the UMA defined signalling. The contents of the messages are as defined in the UMA and 3GPP specifications, and are therefore not explained in this document. The procedure is similar for both GSM and UMTS.

The sequence of steps illustrated In FIG. 13 is detailed below:

The CM Service Request 1301 is sent from the mobile 122 to the UNC 152 via the uplink direct transfer wrapper 1303.

Authentication is performed transparently with the uplink and downlink direct transfer messages 1305, 1307, 1309, 1311.

For GSM, the URR Ciphering Mode Command 1313 is sent from the UNC 152 to the basestation 110, which maps it on to the Ciphering Mode Command 1315 sent from the basestation to the mobile 122. The Ciphering Mode Complete message 1317 is sent from the mobile 122 to the basestation 110, which maps it on to the URR Ciphering Mode Complete message 1319. For UMTS the Security Mode messages 1321, 1323, 1325, 1327 replace the Ciphering Mode messages 1313, 1315, 1317, 1319.

The CM Service Accept 1331 is sent from the UNC 152 to the basestation in the URR downlink direct transfer wrapper message 1329, and forwarded by the basestation to the mobile 122.

The Setup message 1333 is sent from the mobile 122 to the basestation, which is forwarded to the UNC in the uplink direct transfer message 1335. The Call Proceeding message 1339 is sent from the UNC to the basestation in the downlink direct transfer wrapper message 1337, and forwarded by the basestation to the mobile.

The URR Activate Channel message 1341, 1349 is sent by the UNC 152 to the basestation 110, which is mapped to the Channel Mode Modify message 1343 for GSM, or the Radio Bearer Reconfiguration message 1351 for UMTS, and sent to the mobile. The Channel Mode Modify Acknowledge message 1345 is sent from the mobile to the basestation for GSM, or the Radio Bearer Reconfiguration Complete message 1353 for UMTS, and mapped to the URR Activate Channel Ack message 1347, 1355 and sent from the basestation 110 to the UNC.

The Alerting and Connect messages 1361, 1365 are sent from the UNC 152 to the basestation in the URR downlink direct transfer wrapper messages 1359, 1363, and forwarded by the basestation to the mobile. The Connect Acknowledge message 1367 is sent from the mobile to the basestation, and forwarded in the URR uplink transfer message 1369 to the UNC to complete the mobile originated call setup procedure.

Mobile Terminated Speech Call Procedure

Figure 14:
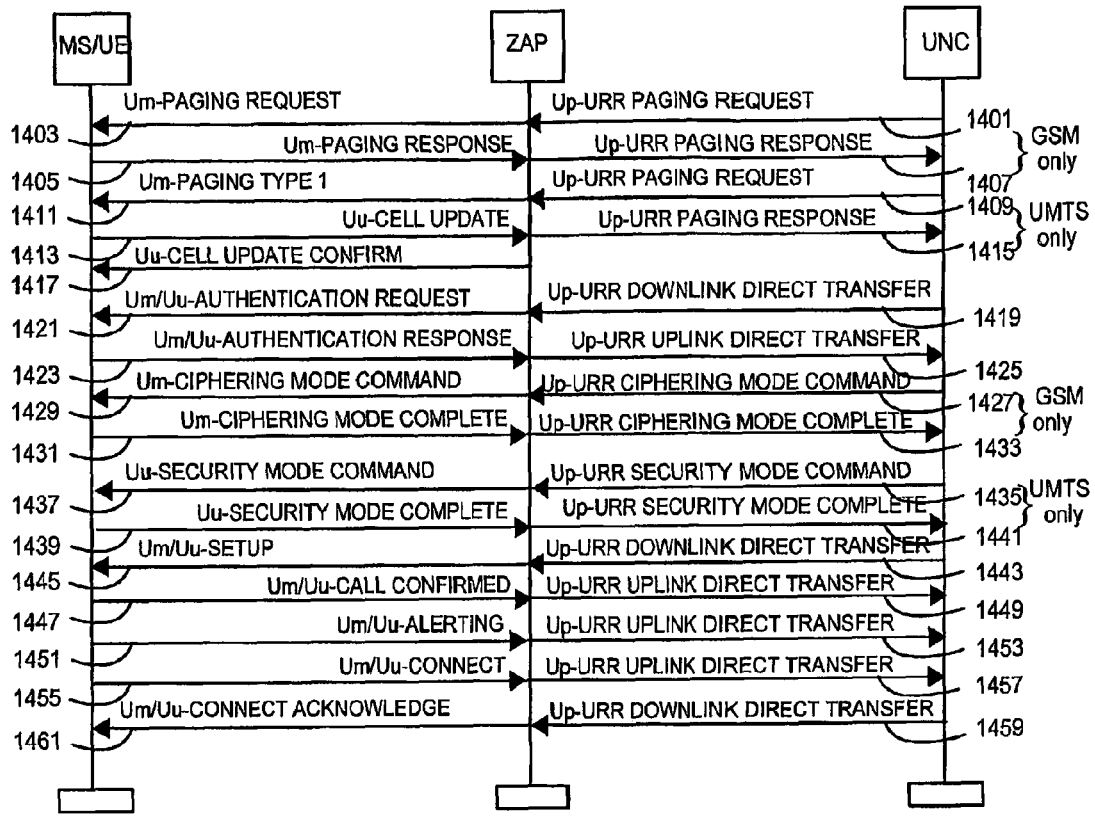
FIG. 14 illustrates a process according to an aspect of the present invention.

The mobile terminated speech call procedure illustrated in FIG. 14 implements the standard GSM signalling between the basestation and the MS/UE 122, which are mapped to the UMA defined signalling. The contents of the messages are as defined in the UMA and 3GPP specifications, and are therefore not explained in this document. The procedure is similar for both GSM and UMTS.

The message interchange shown in FIG. 14 is described in the sequence of steps below:

The URR PAGING REQUEST 1401 is sent from the UNC to the basestation in order to start the mobile-terminated speech call. The PAGING REQUEST 1403 is generated by the basestation and transmitted to the MS/UE. The MS PAGING RESPONSE message 1405 is received by the basestation which generates and sends the URR PAGING RESPONSE 1407 to the UNC. For UMTS the PAGING TYPE 1 message 1411 is generated by the basestation to the UE which responds with the CELL UPDATE procedure 1413.

The UNC performs the authentication procedures with the downlink and uplink direct transfer messages 1419, 1421, 1423, 1425, and the ciphering procedures with the CIPHERING MODE COMMAND and CIPHERING MODE COMPLETE messages 1427, 1429, 1431, 1433 for GSM, or the SECURITY MODE messages 1435, 1437, 1439, 1441 for UMTS.

The remainder of the call setup procedure is performed transparently by the UNC transmission and reception of the downlink and uplink direct transfer messages. The basestation 110 coverts each uplink and downlink message into the required air-interface SETUP (1443-1445), CALL CONFIRMED (1447-1449), ALERTING (1451-1453), CONNECT (1455-1457), and CONNECT ACKNOWLEDGE (1459-1461) messages.

URLC Transport Channel Activation Procedure

Figure 15:
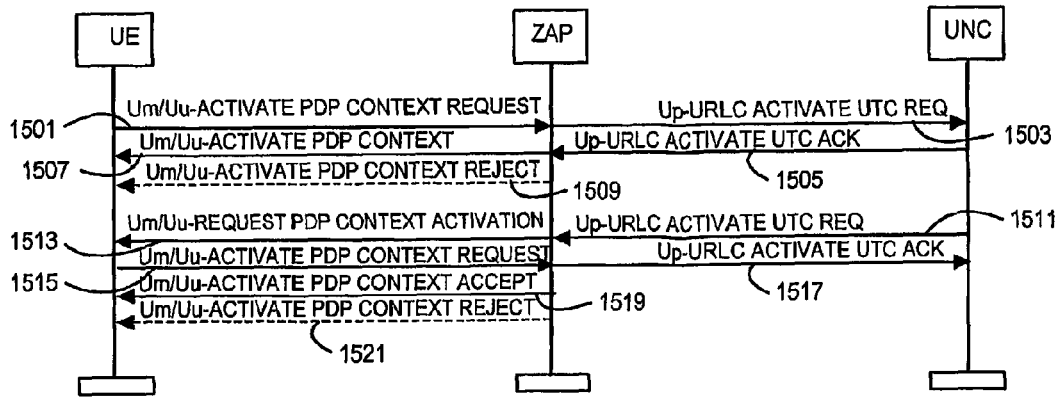
FIG. 15 illustrates a process according to an aspect of the present invention.

The URLC Transport Channel activation procedures shown in FIG. 15 are UMA-defined procedures, which are mapped onto the GPRS air-interface PDP Context Activation procedures. The contents of the messages are as defined in the UMA and 3GPP specifications, and are therefore not explained in this document. The Transport Channel activation procedures are the same for both GSM and UMTS.

The message interchange shown in FIG. 15 is summarised in the sequence of steps below:

The activation of the URLC transport channel may be activated by the UE by initiating the PDP Context Activation procedure. The ACTIVATE PDP CONTEXT REQUEST 1501 is mapped to the URLC ACTIVATE UTC REQ message 1503, and the URLC ACTIVATE UTC ACK 1505 received from the UNC is mapped to the ACTIVATE PDP CONTEXT ACCEPT message 1507. If the URLC ACTIVATE UTC ACK 1505 contains a negative acknowledgement, the ACTIVATE PDP CONTEXT REJECT message 1509 is generated instead of the accept message.

The activation of the URLC transport channel may be activated by the UNC by sending the URLC ACTIVATE UTC REQ 1511. This message is mapped to the REQUEST PDP CONTEXT ACTIVATION message 1513 and sent to the UE. The UE in response generates the ACTIVATE PDP CONTEXT REQUEST message 1515, which the basestation maps to both the URLC ACTIVATE UTC ACK 1517 and ACTIVATE PDP CONTEXT ACCEPT 1519 messages. In this case the ZAP decides whether the PDP Context Activation procedure is successful, and generates the ACTIVATE PDP CONTEXT REJECT message 1521 if not.

URLC Transport Channel Deactivation Procedure

Figure 16:
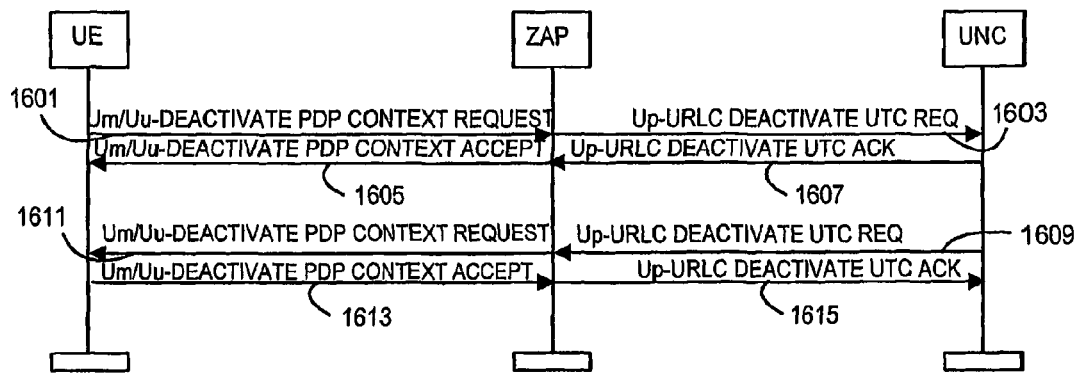
FIG. 16 illustrates a process according to an aspect of the present invention.

The URLC Transport Channel deactivation procedures shown in FIG. 16 are UMA-defined procedures, which are mapped onto the GPRS air-interface PDP Context Deactivation procedures. The contents of the messages are as defined in the UMA and 3GPP specifications, and are therefore not explained in this document. The Transport Channel deactivation procedures are the same for both GSM and UMTS.

The message interchange shown in FIG. 16 is summarised in the sequence of steps below.

The deactivation of the URLC transport channel may be initiated by the UE or the network.

The UE initiates the URLC transport channel deactivation by sending the DEACTIVATE PDP CONTEXT REQUEST message 1601 to the basestation, which generates and sends the URLC DEACTIVATE UTC REQ message 1603 to the UNC 152. The UNC 152 replies with the URLC DEACTIVATE UTC ACK message 1607 which is mapped by the basestation to the DEACTIVATE PDP CONTEXT ACCEPT 1605 and sent to the MS.

The network initiates the URLC transport channel deactivation by sending the URLC DEACTIVATE UTC REQ message 1609 to the basestation, which generates and sends the DEACTIVATE PDP CONTEXT REQUEST message 1611 to the UE. The UE replies with the DEACTIVATE PDP CONTEXT ACCEPT message 1613 which is mapped by the basestation to the URLC DEACTIVATE UTC ACK 1615 and sent to the UNC.

Paging Procedures

Figure 17:
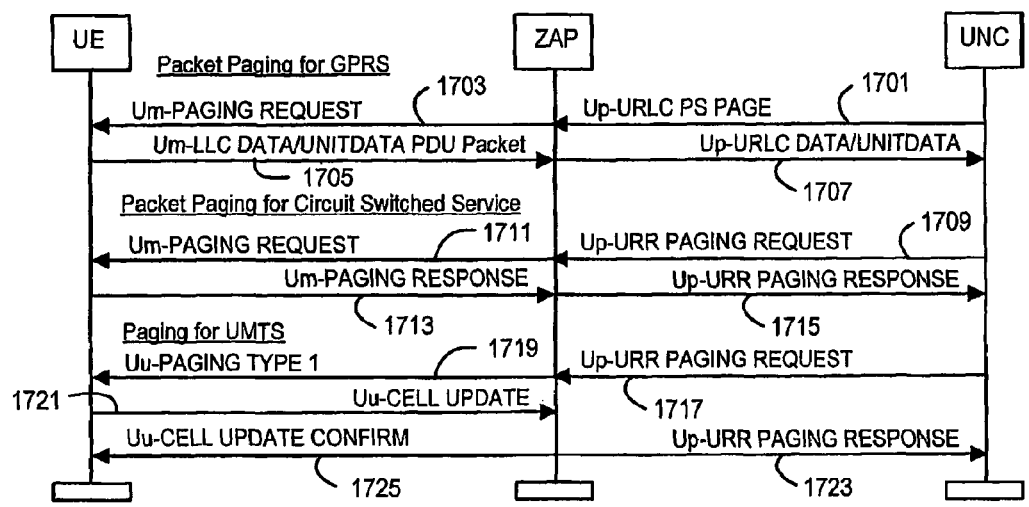
FIG. 17 illustrates processes according to an aspect of the present invention.

The paging procedures shown in FIG. 17 comprise the packet paging procedure for packet-switched services, and the normal paging procedure for circuit-switched services. Both paging procedures are always initiated by the network. The contents of the messages are as defined in the UMA and 3GPP specifications, and are therefore not explained in this document.

The message interchange shown in FIG. 17 is summarised in the sequence of steps below.

The packet paging procedure is initiated by the network by sending the URLC PS PAGE message 1701 from the UNC to the basestation, which is mapped to the PAGING REQUEST 1703 and sent to the MS. The MS responds by sending any LLC UNITDATA or DATA packet 1705 to the basestation which maps the message to the URLC UNITDATA or DATA message 1707.

The circuit-switched paging procedure is initiated by the network by sending the URR PAGING REQUEST message 1709 from the UNC to the basestation, which is mapped to the PAGING REQUEST 1711 and sent to the MS. The MS responds by sending the PAGING RESPONSE 1713 to the basestation which maps the message to the URR PAGING RESPONSE message 1715 and sends it to the UNC.

The UMTS paging procedure is initiated by the network by sending the URR PAGING REQUEST message 1717 from the UNC to the basestation, which is mapped to the PAGING TYPE 1 message 1719 and sent to the UE. The UE responds by sending the CELL UPDATE 1721 to the basestation which responds with the CELL UPDATE CONFRIM 1725, and maps the message to the URR PAGING RESPONSE message 1723 and sends it to the UNC.

GERAN to UMAN Handover Procedure

Figure 18:
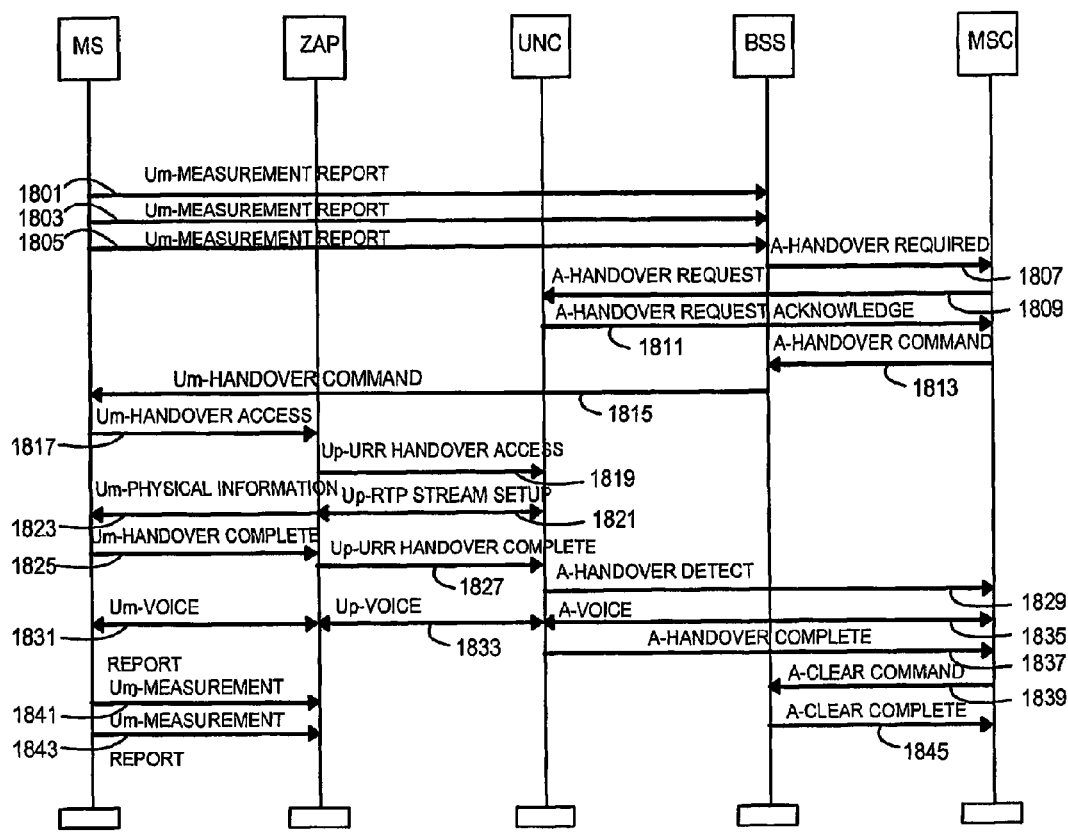
FIG. 18 illustrates a process according to an aspect of the present invention.

The GERAN to UMAN sequence shown in FIG. 18 assumes that the MS has an active voice call on the GERAN. The following steps are followed. Note that the network element signalling between the UNC and MSC, and between the BSS and MSC are shown for clarification purposes only. The contents of all the messages shown are as defined in the UMA and 3GPP specifications, and are therefore not explained in this document.

The message interchange shown in FIG. 18 is summarised in the steps below.

The MS sends MEASUREMENT REPORTs 1801, 1803, 1805 etc on a continual basis to the BSS containing the {ARFCN,BSIC} of the surrounding cells. The basestation 110 {ARFCN,BSIC} will be included in the measurement reports if the basestation transmitted BCCH carrier power is sufficient and/or the basestation ARFCN is transmitted in the BSC BA list (contained in the SYSTEM INFORMATION transmitted by the BSS BCCH serving cell).

The basestation 110 should be reported by the MS as having the highest signal level compared to the serving and neighbouring GERAN cells.

The BSS internally maps the basestation 110 {ARFCN, BSIC} to a UMA cell CGI. The GERAN decides to handover to the UMA cell by sending a HANDOVER REQUIRED message 1807 to the core network 130 MSC.

The core network 130 requests the target UNC 152 to allocate resources for the handover using the HANDOVER REQUEST message 1809. The UNC 152 should map the IMSI contained in the HANDOVER REQUEST 1809 to the MS user's home basestation 110. The target home basestation 110 may or may not be the basestation 110 seen currently by the MS.

The target UNC 152 acknowledges the request, using the HANDOVER REQUEST ACKNOWLEDGE 1811, indicating it can support the requested handover, which also contains the HANDOVER COMMAND contents indicating the home basestation 110 radio channel parameters to which the MS should be directed.

The core network 130 forwards the HANDOVER COMMAND 1813 to the GERAN, completing the handover preparation.

The GERAN sends the HANDOVER COMMAND 1815 to the MS to indicate a handover to the basestation. The HANDOVER COMMAND 1815 contains the ARFCN, PLMN colour code and BSIC of the target basestation 110. The MS does not switch its audio path from GERAN to UMAN until handover completion.

The MS accesses the basestation 110 using the HANDOVER ACCESS message 1817. The handover reference contained in the HANDOVER ACCESS message 1817 is passed to the UNC in the URR HANDOVER ACCESS message 1819, which allows the serving UNC to correlate the handover to the HANDOVER REQUEST ACKNOWLEDGE message 1811.

The serving UNC 152 sets up the bearer path with the basestation and MS.

The basestation 110 transmits the URR HANDOVER COMPLETE message 1827 to indicate the completion of the handover procedure. The MS switches from the GERAN user plane to the UMAN user plane.

Bi-directional voice traffic 1831, 1833, 1835 starts to flow between the MS 122 and core network 130 via the serving UNC 152.

The target UNC indicates the handover is complete, using the HANDOVER COMPLETE message 1837. If not already done so, the core network switches the user plane from the source GERAN to the target UMAN.

As required, subsequently, the core network 130 tears down the connection to the source GERAN using the CLEAR COMMAND 1839.

The source GERAN confirms the release of GERAN resources allocated for this call, using CLEAR COMPLETE 1845.

UMAN to GERAN Handover Procedure

Figure 19:
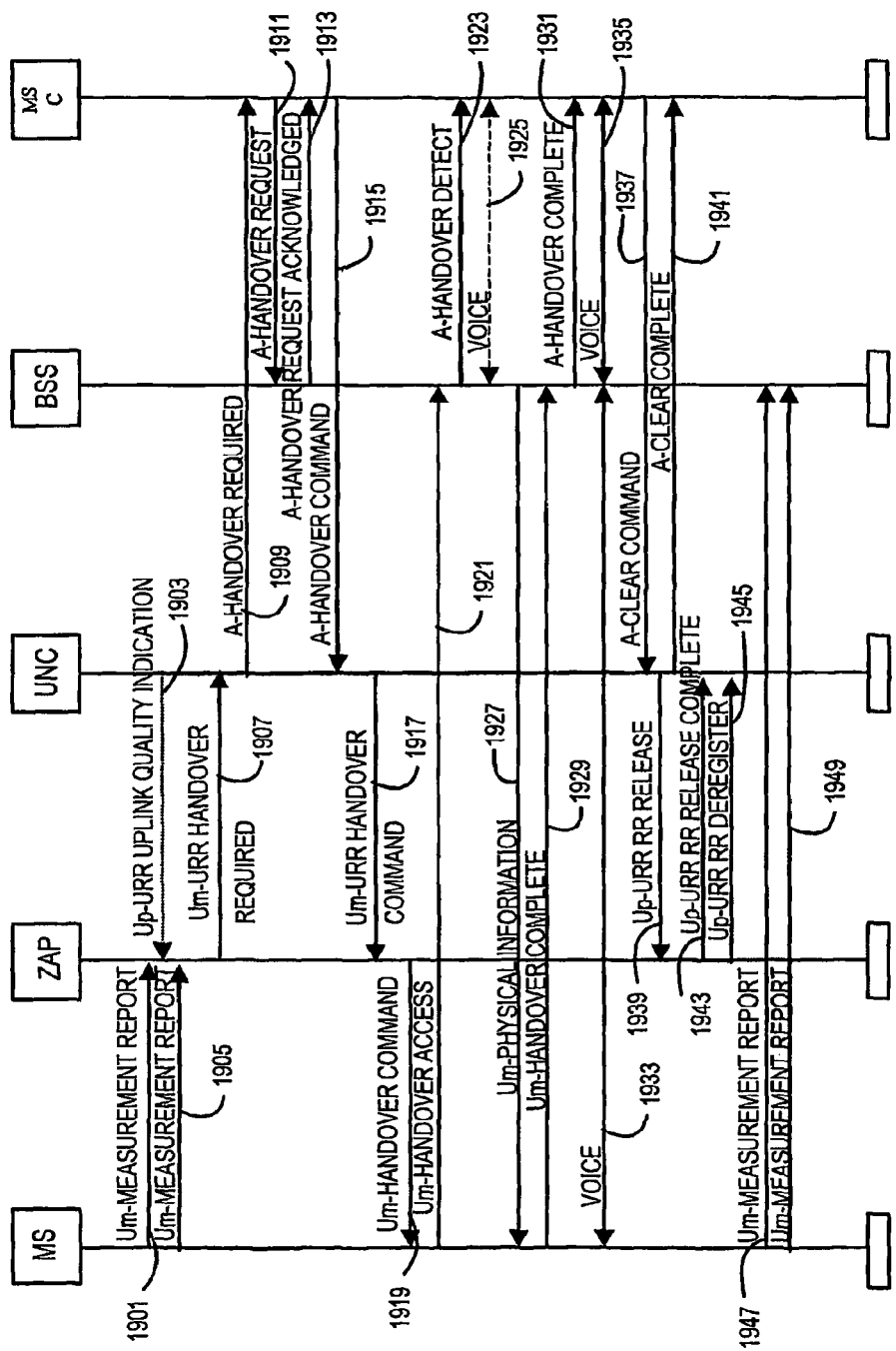
FIG. 19 illustrates a process according to an aspect of the present invention.

The UMAN to GERAN sequence shown in FIG. 19 assumes that the MS has an active voice call on the UMAN. The MS begins to leave coverage of the basestation 110 in accordance with the invention. The following steps are followed. Note that the network element signalling between the UNC and MSC, and between the BSS and MSC are shown for clarification purposes only. The contents of all the messages shown are as defined in the UMA and 3GPP specifications, and are therefore not explained in this document.

The message sequence shown in FIG. 19 is summarised in the sequence of steps below.

The handover from UMAN to GERAN is triggered by the MS measurement reports 1901, 1905 of the surrounding GERAN {ARFCN,BSIC} BCCH-carrier power levels. The UNC may send an optional URR UPLINK QUALITY INDICATION 1903 based on signal strength criterion.

The basestation 110 detects that a handover is required, and sends the URR HANDOVER REQUIRED message 1907 to the serving UNC 152 indicating the Channel Mode and a list of GERAN cells, identified by CGI in order of preference for handover. The basestation 110 may obtain the list of CGIs by decoding the System Information messages in the surrounding GERAN cells itself, or may obtain a list of CGIs (and their corresponding ARFCN,BSICs) by accessing an appropriate database in relation to its actual geographical position (by postcode or other geographical positioning device).

The serving UNC starts the handover preparation by signalling to the core network 130 using the HANDOVER REQUIRED message 1909.

The core network selects a target GERAN cell and requests it to allocate the necessary resources, using HANDOVER REQUEST 1911.

The target GERAN builds a HANDOVER COMMAND message providing information on the channel allocated and sends it to the core network through the HANDOVER REQUEST ACKNOWLEDGE message 1913.

The core network signals the serving UNC to handover the MS to the GERAN, using the HANDOVER COMMAND message 1915, ending the handover preparation phase.

The serving UNC transmits the URR HANDOVER COMMAND 1917 to the basestation 110 including details sent by the GERAN on the target resource allocation. The basestation 110 transmits the HANDOVER COMMAND 1919 to the MS 122 indicating the MS should handover to the GERAN cell.

The MS transmits the HANDOVER ACCESS command 1921 containing the handover reference parameter to allow the target GERAN to correlate this handover access with the HANDOVER COMMAND message transmitted earlier to the core network in response to the HANDOVER REQUIRED.

The target GERAN confirms the detection of the handover to the core network, using the HANDOVER DETECT message 1923.

The core network may at this point switch the user plane to the target BSS.

The GERAN provides PHYSICAL INFORMATION 1927 to the MS i.e. timing advance, to allow the MS to synchronise with the GERAN.

The MS signals to the GERAN that the handover is completed, using the HANDOVER COMPLETE 1929.

The GERAN confirms to the core network the completion of the handover, using the HANDOVER COMPLETE message 1931. If the user plane has not already been switched, the core network switches the user plane to the target BSS.

Bi-directional voice traffic 1933, 1935 is now flowing between the MS and core network via the GERAN.

The core network indicates to the serving UNC to release any resources allocated to the MS using the CLEAR COMMAND 1937.

The serving UNC commands the basestation 110 to release resources using the URR RR RELEASE message 1939.

The serving UNC confirms resource release to the core network using the CLEAR COMPLETE message 1941.

The basestation 110 confirms resource release to the serving UNC using the URR RR RELEASE COMPLETE message 1943.

The basestation 110 may finally deregister from the serving UNC using the URR DEREGISTER message 1945.

Inter-RAT UMTS to UMAN-GERAN Handover Procedure

Figure 20:
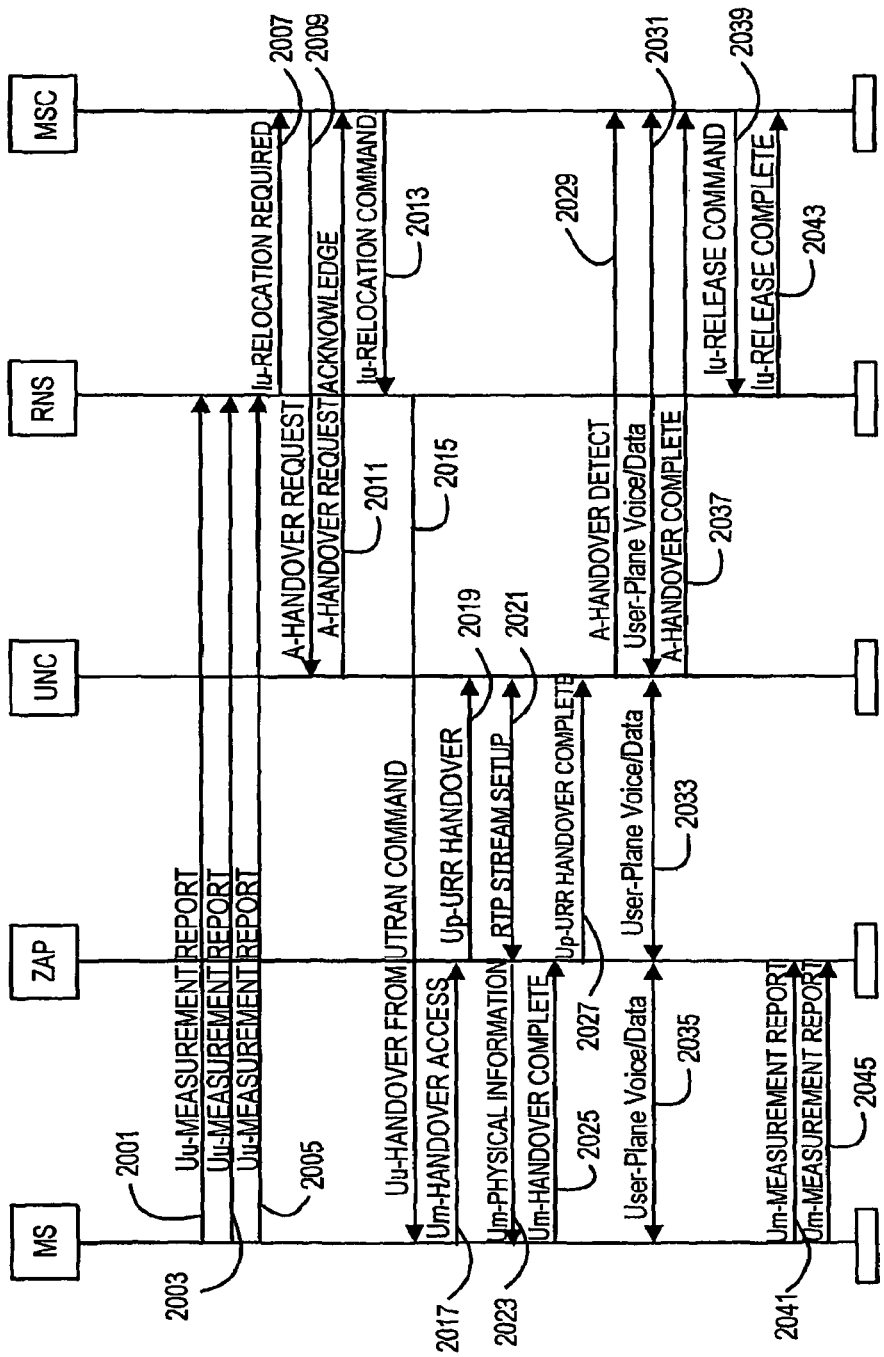
FIG. 20 illustrates a process according to an aspect of the present invention.

The UMTS to UMAN-GERAN sequence shown in FIG. 20 assumes that the MS has an active voice call on the UMTS network. It is possible to generate a handover between a UMTS macro-network and a GERAN-only enabled UNC and ZoneGate through an Inter-RAT (Radio Access Technology) handover procedure. The following steps are followed. Note that the network element signalling between the UNC and MSC, and between the BSS and MSC are shown for clarification purposes only. The contents of all the messages shown are as defined in the UMA and 3GPP specifications, and are therefore not explained in this document.

The message interchange shown in FIG. 20 is summarised in the sequence of steps below.

The MS 122 sends MEASUREMENT REPORTs 2001, 2003, 2005 on a continual basis to the RNS Node-B basestation containing the {Primary Scrambling Code, UARFCN, Cell Identity} of the surrounding UMTS cells, and the {ARFCN,BSIC} of the surrounding GERAN cells if the MS has been directed to monitor surrounding GERAN cells in the "inter-RAT cell info" part of the CELL_INFO_LIST variable. The basestation 110 {ARFCN,BSIC} will be included in the measurement reports if the basestation transmitted BCCH carrier power is sufficient if such inter-RAT measurements are enabled.

The basestation 110 should be reported by the MS as having the highest signal level compared to the serving and neighbouring UMTS cells.

The RNS internally maps the basestation 110 {ARFCN, BSIC} to a UMA cell CGI. The UMTS network decides to handover to the UMA cell by sending a RELOCATION REQUIRED message 2007 to the core network 3G-MSC.

The core network requests the target UNC to allocate resources for the handover using the HANDOVER REQUEST message 2009. The UNC should map the IMSI contained in the HANDOVER REQUEST to the MS user's home basestation 110. The target home basestation 110 may or may not be the basestation 110 seen currently by the MS.

The target UNC acknowledges the request, using the HANDOVER REQUEST ACKNOWLEDGE 2011, indicating it can support the requested handover, which also contains the HANDOVER COMMAND contents indicating the home basestation radio channel parameters to which the MS should be directed.

The core network 3G-MSC forwards the RELOCATION COMMAND 2013 to the RNS, completing the handover preparation.

The UMTS network sends the HANDOVER FROM UTRAN COMMAND 2015 to the MS to indicate a handover towards the basestation 110. The HANDOVER FROM UTRAN COMMAND 2015 contains the ARFCN, PLMN colour code and BSIC of the target basestation 110. The MS does not switch its audio path from UMTS to UMAN until handover completion.

The MS accesses the basestation using the HANDOVER ACCESS message 2017. The handover reference contained in the HANDOVER ACCESS message 2017 is passed to the UNA in the URR HANDOVER ACCESS message 2019, which allows the serving UNC to correlate the handover to the HANDOVER REQUEST ACKNOWLEDGE message 2011.

The serving UNC sets up the bearer path with the basestation 110 and MS.

The basestation 110 transmits the URR HANDOVER COMPLETE message 2027 to indicate the completion of the handover procedure. The MS switches from the UMTS user plane to the UMAN user plane.

Bi-directional voice traffic 2031, 2033, 2035 is flowing between the MS and core network via the serving UNC.

The target UNC indicates the handover is complete, using the HANDOVER COMPLETE message 2037. If not already done so, the core network switches the user plane from the source UMTS to the target UMAN.

The core network tears down the connection to the source UMTS network using the RELEASE COMMAND 2039.

The source UMTS network confirms the release of resources allocated for this call, using RELEASE COMPLETE 2041.

Inter-RAT UMAN-GERAN to UMTS Handover Procedure

Figure 21:
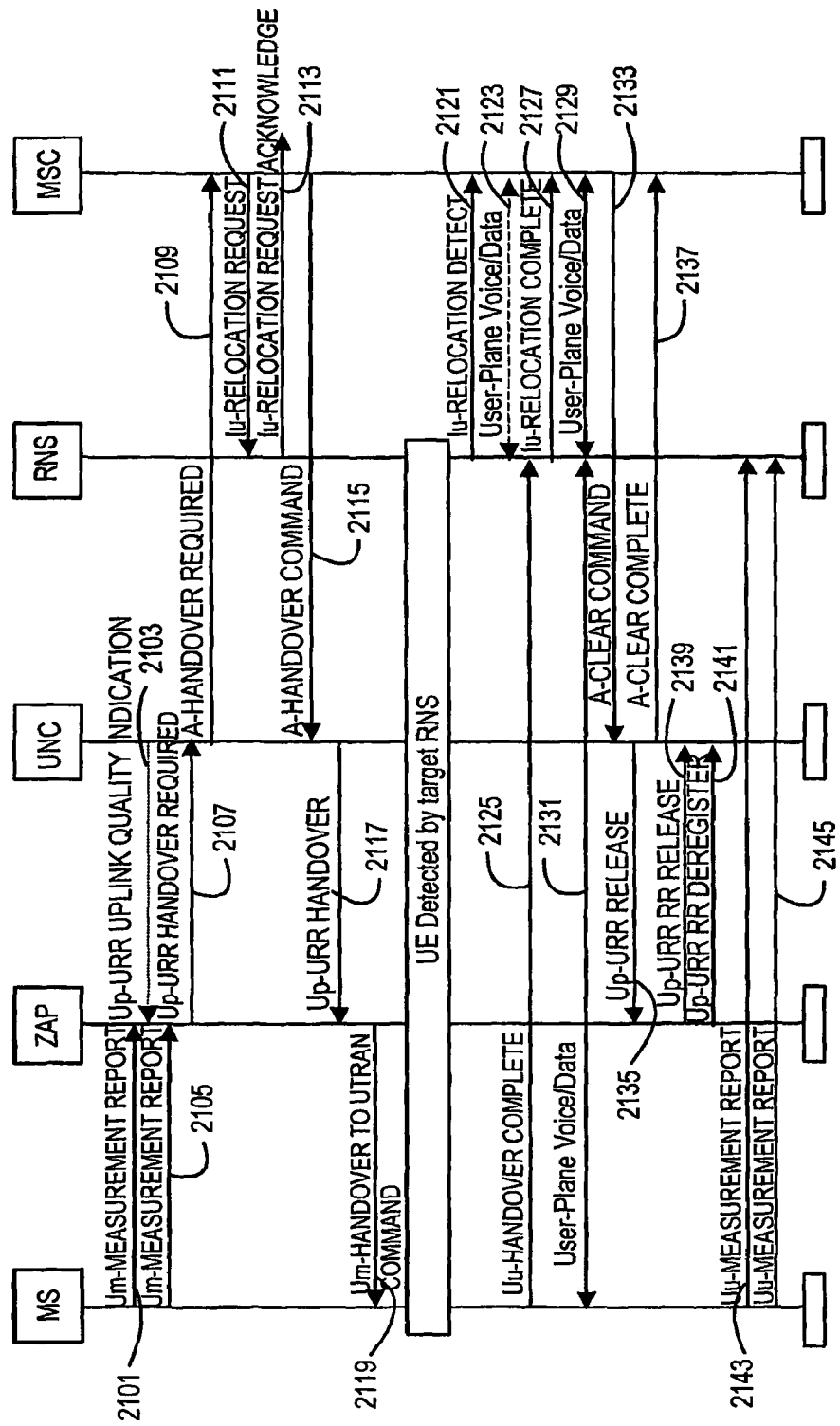
FIG. 21 illustrates a process according to an aspect of the present invention.

The Inter-RAT UMAN-GERAN to UMTS handover sequence shown in FIG. 21 assumes that the MS has an active voice call on the UMAN-enabled basestation network. It is possible to generate a handover between a GERAN-only UMAN-enabled basestation and a UMTS macro-network through the Inter-RAT handover procedure. The following steps are followed. Note that the network element signalling between the UNC and MSC, and between the BSS and MSC are shown for clarification purposes only. The contents of all the messages shown are as defined in the UMA and 3GPP specifications, and are therefore not explained in this document.

The message interchange shown in FIG. 21 is summarised in the steps below. The inter-RAT handover from UMAN to the UMTS macro-network is triggered by the MS measurement reports 2101, 2105 of the surrounding macro-network UMTS {ARFCN,BSIC} BCCH-carrier power levels. The UNC may send an optional URR UPLINK QUALITY INDICATION 2103 based on signal strength criterion.

The basestation 110 detects that a handover is required, and sends the URR HANDOVER REQUIRED message 2107 to the serving UNC indicating the Channel Mode and a list of GERAN cells, identified by CGI in order of preference for handover. The basestation 110 may obtain the list of CGIs by decoding the System Information messages in the surrounding GERAN cells itself, or may obtain a list of CGIs (and their corresponding ARFCN,BSICs) by accessing an appropriate database in relation to its actual geographical position (by postcode or other geographical positioning device).

The serving UNC starts the handover preparation by signalling to the core network using the HANDOVER REQUIRED message 2109.

The core network selects a target UMTS cell and requests it to allocate the necessary resources, using RELOCATION REQUEST 2111.

The target UMTS RNS builds a HANDOVER COMMAND message providing information on the channel allocated and sends it to the core network through the RELOCATION REQUEST ACKNOWLEDGE message 2113.

The core network signals the serving UNC to handover the MS to the UMTS network, using the HANDOVER COMMAND message 2115, ending the handover preparation phase.

The serving UNC transmits the URR HANDOVER COMMAND 2117 to the basestation 110 including details sent by the UMTS network on the target resource allocation. The basestation 110 transmits the HANDOVER TO UTRAN COMMAND 2119 to the MS indicating the MS should handover to the UMTS cell.

The MS is detected by the target UMTS network RNS due to lower layer transmissions from the MS. The target RNS confirms the detection of the handover to the core network, using the RELOCATION DETECT message 2121.

The core network may at this point switch the user plane to the target RNS.

Once the MS is synchronised with the UMTS RNS, the MS signals that the handover is completed, using the HANDOVER COMPLETE 2125.

The UMTS RNS confirms to the core network the completion of the handover, using the RELOCATION COMPLETE message 2127. If the user plane has not already been switched, the core network switches the user plane to the target RNS.

Bi-directional user-plane traffic 2129, 2131 is now flowing between the MS and core network via the UMTS core network.

The core network indicates to the serving UNC to release any resources allocated to the MS using the CLEAR COMMAND 2133.

The serving UNC commands the basestation 110 to release resources suing the URR RR RELEASE message 2135.

The serving UNC confirms resource release to the core network using the CLEAR COMPLETE message 2137.

The basestation 110 confirms resource release to the serving UNC using the URR RR RELEASE COMPLETE message 2139.

The basestation 110 may finally deregister from the serving UNC using the URR DEREGISTER message 2141.

UMTS to UMAN-UMTS Handover

Figure 22:
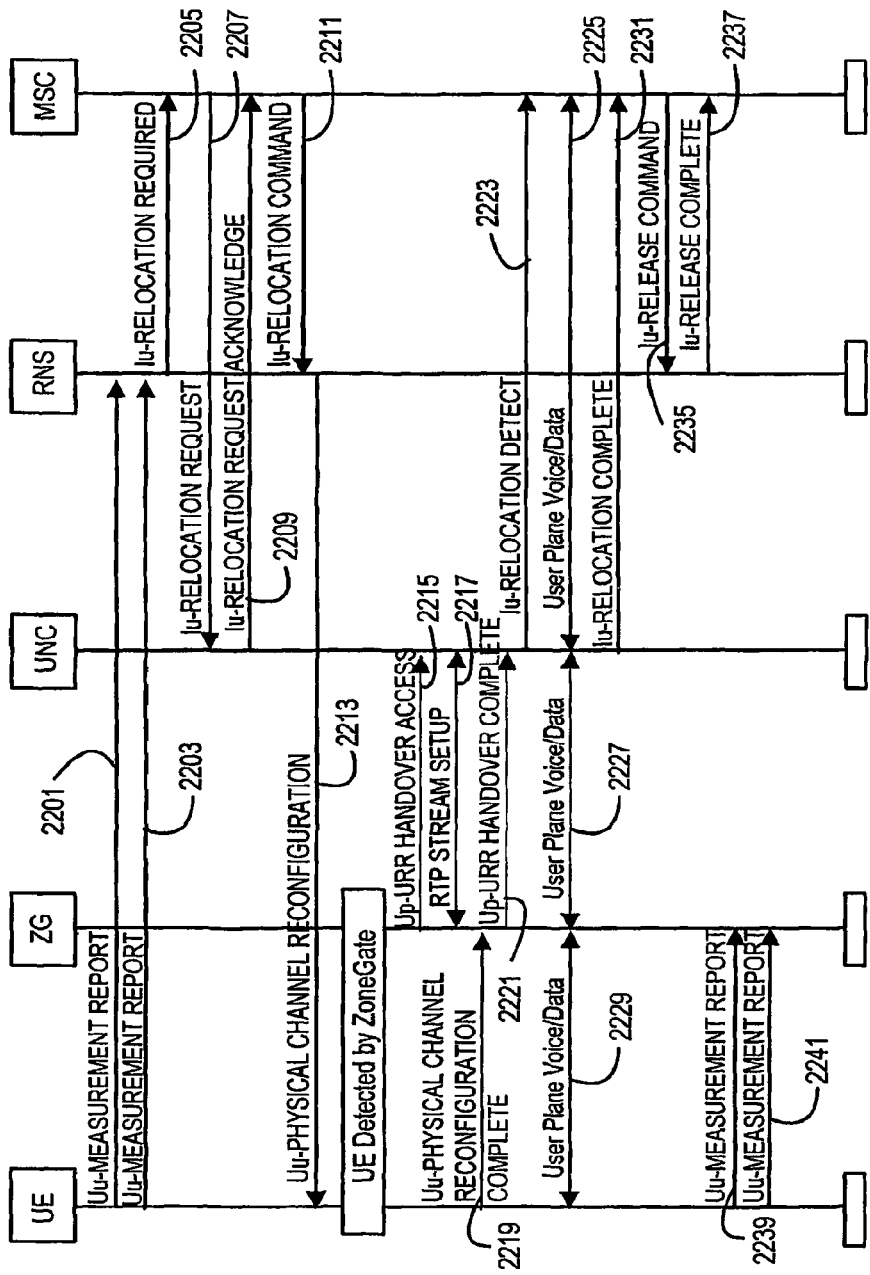
FIG. 22 illustrates a process according to an aspect of the present invention.

The UMTS to UMAN-UMTS sequence shown in FIG. 22 assumes that the UE has an active voice call on the UMTS network. The following steps are followed.

The UE sends MEASUREMENT REPORTs 2201, 2203 on a continual basis to the RNS Node-B base-station containing the {Primary Scrambling Code, UARFCN, Cell Identity} of the surrounding UMTS cells.

The basestation 110 should be reported by the UE as having the highest signal level compared to the serving and neighbouring UMTS cells.

The RNS internally maps the basestation 110 {Primary Scrambling Code, UARFCN, Cell Identity} to a UMA cell CGI. The UMTS network decides to handover to the UMA cell by sending a RELOCATION REQUIRED message 2205 to the core network 3G-MSC.

The core network requests the target UNC to allocate resources for the handover using the RELOCATION REQUEST message 2207. The UNC should map the IMSI contained in the RELOCATION REQUEST 2207 to the UE user's home basestation 110. The target home basestation may or may not be the basestation 110 seen currently by the UE.

The target UNC acknowledges the request, using the RELOCATION REQUEST ACKNOWLEDGE 2209, indicating it can support the requested handover, which also contains the RELOCATION COMMAND contents indicating the home basestation radio channel parameters to which the UE should be directed.

The core network 3G-MSC forwards the RELOCATION COMMAND 2211 to the RNS, completing the handover preparation.

The UMTS network sends the PHYSICAL CHANNEL RECONFIGURATION 2213 to the UE to indicate a handover towards the basestation. The PHYSICAL CHANNEL RECONFIGURATION contains the physical channel information of the target basestation. The UE does not switch its audio path from UMTS to UMAN until handover completion.

The UE is detected by the basestation 110 through Layer 1 synchronisation and Layer 2 link establishment. The URR HANDOVER ACCESS message 2215 is transmitted from the basestation to the UNC, which allows the serving UNC to correlate the handover to the RELOCATION REQUEST ACKNOWLEDGE message.

The serving UNC sets up the bearer path with the basestation 110 and UE.

On reception of the PHYSICAL CHANNEL RECONFIGURATION COMPLETE 2219 from the UE, the basestation transmits the URR HANDOVER COMPLETE message 2221 to indicate the completion of the handover procedure. The UNC transmits the RELOCATION DETECT 2223 to the MSC.

The UE switches from the UMTS user plane to the UMAN user plane. Bi-directional voice and/or data traffic 2225, 2227, 2229 is flowing between the UE and core network via the serving UNC.

The target UNC indicates the handover is complete, using the RELOCATION COMPLETE message 2231. If not already done so, the core network switches the user plane from the source UMTS to the target UMAN.

The core network tears down the connection to the source UMTS network using the RELEASE COMMAND 2235.

The source UMTS network confirms the release of resources allocated for this call, using RELEASE COMPLETE 2237.

UMAN-UMTS to UMTS Handover

Figure 23:
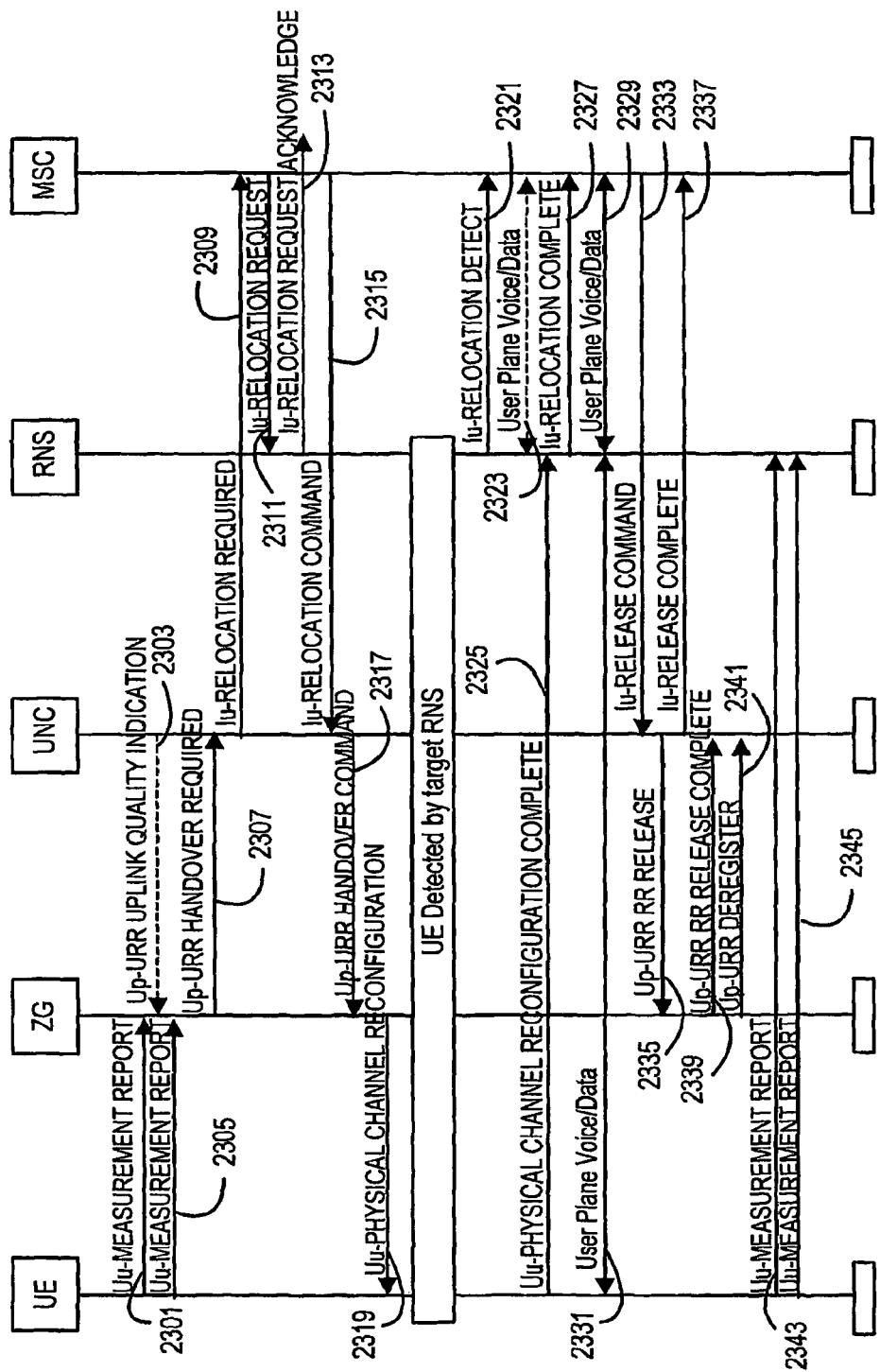
FIG. 23 illustrates a process according to an aspect of the present invention.

The UMAN-UMTS to UMTS sequence shown in FIG. 23 assumes that the UE has an active voice or data call on the UMAN in UMTS mode. The UE begins to leave coverage of the basestation 110. The following steps are followed.

The message interchange shown in FIG. 23 is summarised in the steps below:

The handover from UMAN to the UMTS macro-network is triggered by the UE measurement reports 2301, 2305 of the surrounding macro-network UMTS {Primary Scrambling Code, UARFCN, Cell Identity} BCCH-carrier power levels. The UNC may send an optional URR UPLINK QUALITY INDICATION 2303 based on signal strength criterion.

The basestation 110 detects that a handover is required, and sends the URR HANDOVER REQUIRED message 2307 to the serving UNC indicating the list of surrounding UMTS cells, identified by CGI in order of preference for handover. The basestation 110 may obtain the list of CGIs by decoding the System Information messages in the surrounding UMTS cells itself, or may obtain a list of CGIs (and their corresponding UARFCN, Primary Scrambling Codes) by accessing an appropriate database in relation to its actual geographical position (by postcode or other geographical positioning device).

The serving UNC starts the handover preparation by signalling to the core network using the RELOCATION REQUIRED message 2309.

The core network selects a target UMTS cell and requests it to allocate the necessary resources, using RELOCATION REQUEST 2311.

The target UMTS RNS builds a RELOCATION COMMAND message providing information on the channel allocated and sends it to the core network through the RELOCATION REQUEST ACKNOWLEDGE message 2313.

The core network signals the serving UNC to handover the UE to the UMTS network, using the RELOCATION COMMAND message 2315, ending the handover preparation phase.

The serving UNC transmits the URR HANDOVER COMMAND 2317 to the basestation 110 including details sent by the UMTS network on the target resource allocation. The basestation 110 transmits the PHYSICAL CHANNEL RECONFIGURATION 2319 to the UE indicating the UE should handover to the UMTS cell.

The UE is detected by the target UMTS network RNS due to lower layer transmissions from the UE. The target RNS confirms the detection of the handover to the core network, using the RELOCATION DETECT message 2321.

The core network may at this point switch the user plane to the target RNS.

Once the UE is synchronised with the UMTS RNS, the UE signals that the handover is completed, using the PHYSICAL CHANNEL RECONFIGURATION COMPLETE 2325.

The UMTS RNS confirms to the core network the completion of the handover, using the RELOCATION COMPLETE message 2327. If the user plane has not already been switched, the core network switches the user plane to the target RNS.

Bi-directional user-plane traffic 2329, 2331 is now flowing between the UE and core network via the UMTS core network.

The core network indicates to the serving UNC to release any resources allocated to the UE using the RELEASE COMMAND 2333.

The serving UNC commands the basestation to release resources suing the URR RR RELEASE message 2335.

The serving UNC confirms resource release to the core network using the RELEASE COMPLETE message 2337.

The basestation confirms resource release to the serving UNC using the URR RR RELEASE COMPLETE message 2339.

The basestation 110 may finally deregister from the serving UNC using the URR DEREGISTER message 2341.

Inter-RAT GERAN to UMAN-UMTS Handover

Figure 24:
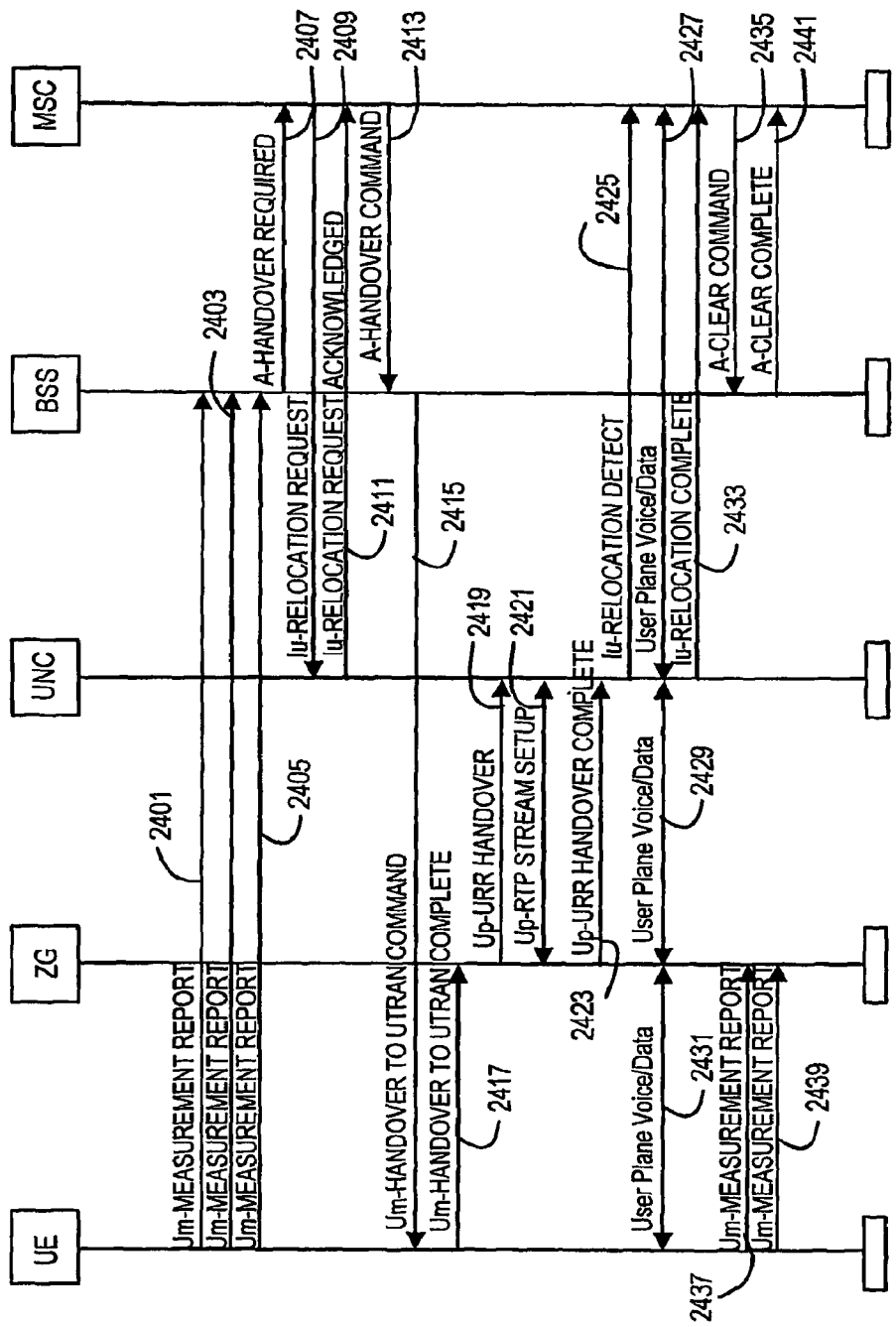
FIG. 24 illustrates a process according to an aspect of the present invention.

The GERAN to UMAN-UMTS sequence shown in FIG. 24 assumes that the UE has an active voice call on the GERAN. The following steps are followed.

The multiband UE sends MEASUREMENT REPORTs 2401, 2403, 2405 on a continual basis to the BSS containing the {ARFCN,BSIC} of the surrounding GERAN cells, and the {Primary Scrambling Code, UARFCN, Cell Identity} of the surrounding UMTS cells.

The basestation 110 should be reported by the UE as having the highest signal level compared to the serving and neighbouring GERAN cells.

The BSS internally maps the basestation 110 {Primary Scrambling Code, UARFCN, Cell Identity} to a UMA cell CGI. The GERAN decides to handover to the UMA cell by sending a HANDOVER REQUIRED message 2407 to the core network MSC.

The core network requests the target UNC to allocate resources for the handover using the RELOCATION REQUEST message 2409. The UNC should map the IMSI contained in the RELOCATION REQUEST to the UE user's home basestation 110. The target home basestation 110 may or may not be the basestation 110 seen currently by the UE.

The target UNC acknowledges the request, using the RELOCATION REQUEST ACKNOWLEDGE 2411, indicating it can support the requested handover, which also contains the HANDOVER COMMAND contents indicating the home basestation radio channel parameters to which the UE should be directed.

The core network forwards the HANDOVER COMMAND 2413 to the GERAN, completing the handover preparation.

The GERAN sends the HANDOVER TO UTRAN COMMAND 2415 to the UE to indicate a handover to the basestation 110. The HANDOVER TO UTRAN COMMAND contains the UARFCN and primary scrambling code of the target basestation 110. The UE does not switch its audio path from GERAN to UMAN until handover completion.

The UE accesses the basestation 110 using the HANDOVER TO UTRAN COMPLETE message 2417. The handover reference contained in the message is passed to the UNC in the URR HANDOVER ACCESS message 2419, which allows the serving UNC to correlate the handover to the RELOCATION REQUEST ACKNOWLEDGE message.

The serving UNC sets up the bearer path with the basestation 110 and UE.

The basestation transmits the URR HANDOVER COMPLETE message 2423 to indicate the completion of the handover procedure. The UE switches from the GERAN user plane to the UMAN user plane.

Bi-directional voice and/or data traffic 2427, 2429, 2431 is flowing between the UE and core network via the serving UNC.

The target UNC indicates the handover is complete, using the RELOCATION COMPLETE message 2433. If not already done so, the core network switches the user plane from the source GERAN to the target UMAN.

The core network tears down the connection to the source GERAN using the CLEAR COMMAND 2435.

The source GERAN confirms the release of GERAN resources allocated for this call, using CLEAR COMPLETE 2441.

UMTS to UMAN-UMTS Handover

Figure 25:
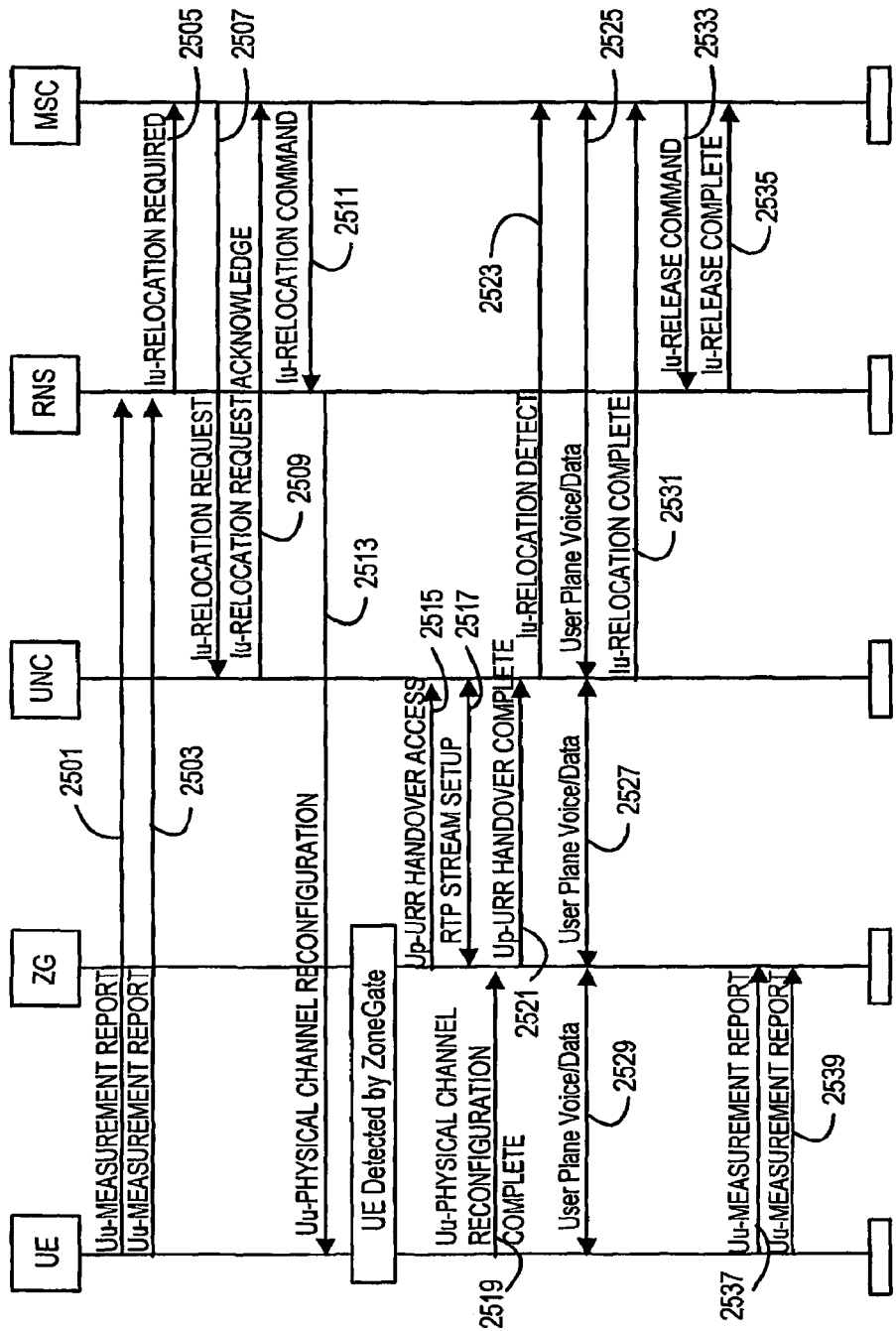
FIG. 25 illustrates a process according to an aspect of the present invention.

The UMTS to UMAN-UMTS sequence shown in FIG. 25 assumes that the UE has an active voice call on the UMTS network. The following steps are followed.

The UE sends MEASUREMENT REPORTs 2501, 2503 on a continual basis to the RNS Node-B base-station containing the {Primary Scrambling Code, UARFCN, Cell Identity} of the surrounding UMTS cells.

The basestation 110 should be reported by the UE as having the highest signal level compared to the serving and neighbouring UMTS cells.

The RNS internally maps the basestation 110 {Primary Scrambling Code, UARFCN, Cell Identity} to a UMA cell CGI. The UMTS network decides to handover to the UMA cell by sending a RELOCATION REQUIRED message 2505 to the core network 3G-MSC.

The core network requests the target UNC to allocate resources for the handover using the RELOCATION REQUEST message 2507. The UNC should map the IMSI contained in the RELOCATION REQUEST to the UE user's home basestation 110. The target home basestation 110 may or may not be the basestation 110 seen currently by the UE.

The target UNC acknowledges the request, using the RELOCATION REQUEST ACKNOWLEDGE 2509, indicating it can support the requested handover, which also contains the RELOCATION COMMAND contents indicating the home basestation radio channel parameters to which the UE should be directed.

The core network 3G-MSC forwards the RELOCATION COMMAND 2511 to the RNS, completing the handover preparation.

The UMTS network sends the PHYSICAL CHANNEL RECONFIGURATION 2513 to the UE to indicate a handover towards the basestation 110. The PHYSICAL CHANNEL RECONFIGURATION 2513 contains the physical channel information of the target basestation. The UE does not switch its audio path from UMTS to UMAN until handover completion.

The UE is detected by the basestation 110 through Layer 1 synchronisation and Layer 2 link establishment. The URR HANDOVER ACCESS message 2515 is transmitted from the basestation to the UNC, which allows the serving UNC to correlate the handover to the RELOCATION REQUEST ACKNOWLEDGE message.

The serving UNC sets up the bearer path with the basestation 110 and UE.

On reception of the PHYSICAL CHANNEL RECONFIGURATION COMPLETE 2519 from the UE, the basestation transmits the URR HANDOVER COMPLETE message 2521 to indicate the completion of the handover procedure. The UNC transmits the RELOCATION DETECT 2523 to the MSC.

The UE switches from the UMTS user plane to the UMAN user plane. Bi-directional voice and/or data traffic 2525, 2527, 2529 is flowing between the UE and core network via the serving UNC.

The target UNC indicates the handover is complete, using the RELOCATION COMPLETE message 2531. If not already done so, the core network switches the user plane from the source UMTS to the target UMAN.

The core network tears down the connection to the source UMTS network using the RELEASE COMMAND 2533.

The source UMTS network confirms the release of resources allocated for this call, using RELEASE COMPLETE 2535.

UMAN-UMTS to UMTS Handover

Figure 26:
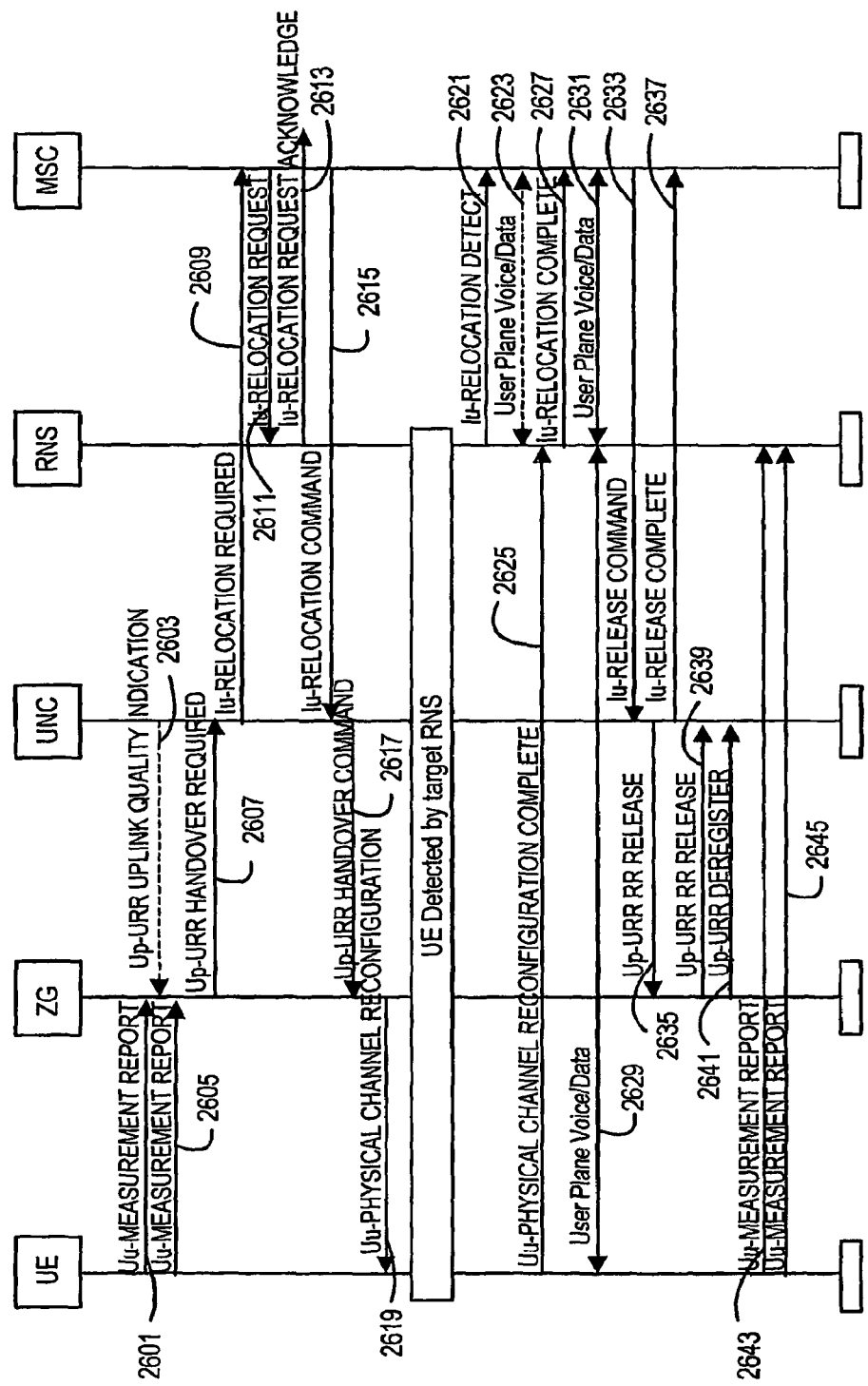
FIG. 26 illustrates a process according to an aspect of the present invention.

The UMAN-UMTS to UMTS sequence shown in FIG. 26 assumes that the UE has an active voice or data call on the UMAN in UMTS mode. The UE begins to leave coverage of the basestation 110. The message interchange shown in FIG. 26 is summarised in the sequence of steps below:

The handover from UMAN to the UMTS macro-network is triggered by the UE measurement reports 2601, 2605 of the surrounding macro-network UMTS {Primary Scrambling Code, UARFCN, Cell Identity} BCCH-carrier power levels. The UNC may send an optional URR UPLINK QUALITY INDICATION 2603 based on signal strength criterion.

The basestation 110 detects that a handover is required, and sends the URR HANDOVER REQUIRED message 2607 to the serving UNC indicating the list of surrounding UMTS cells, identified by CGI in order of preference for handover. The basestation may obtain the list of CGIs by decoding the System Information messages in the surrounding UMTS cells itself, or may obtain a list of CGIs (and their corresponding UARFCN, Primary Scrambling Codes) by accessing an appropriate database in relation to its actual geographical position (by postcode or other geographical positioning device).

The serving UNC starts the handover preparation by signalling to the core network using the RELOCATION REQUIRED message 2609.

The core network selects a target UMTS cell and requests it to allocate the necessary resources, using RELOCATION REQUEST 2611.

The target UMTS RNS builds a RELOCATION COMMAND message providing information on the channel allocated and sends it to the core network through the RELOCATION REQUEST ACKNOWLEDGE message 2613.

The core network signals the serving UNC to handover the UE to the UMTS network, using the RELOCATION COMMAND message 2615, ending the handover preparation phase.

The serving UNC transmits the URR HANDOVER COMMAND 2617 to the basestation 110 including details sent by the UMTS network on the target resource allocation. The basestation 110 transmits the PHYSICAL CHANNEL RECONFIGURATION 2619 to the UE indicating the UE should handover to the UMTS cell.

The UE is detected by the target UMTS network RNS due to lower layer transmissions from the UE. The target RNS confirms the detection of the handover to the core network, using the RELOCATION DETECT message 2621.

The core network may at this point switch the user plane to the target RNS.

Once the UE is synchronised with the UMTS RNS, the UE signals that the handover is completed, using the PHYSICAL CHANNEL RECONFIGURATION COMPLETE 2625.

The UMTS RNS confirms to the core network the completion of the handover, using the RELOCATION COMPLETE message 2627. If the user plane has not already been switched, the core network switches the user plane to the target RNS.

Bi-directional user-plane traffic 2629, 2631 is now flowing between the UE and core network via the UMTS core network.

The core network indicates to the serving UNC to release any resources allocated to the UE using the RELEASE COMMAND 2633.

The serving UNC commands the basestation 110 to release resources suing the URR RR RELEASE message 2635.

The serving UNC confirms resource release to the core network using the RELEASE COMPLETE message 2637.

The basestation 110 confirms resource release to the serving UNC using the URR RR RELEASE COMPLETE message 2639.

The basestation 110 may finally deregister from the serving UNC using the URR DEREGISTER message 2641.

Inter-RAT GERAN to UMAN-UMTS Handover

Figure 27:
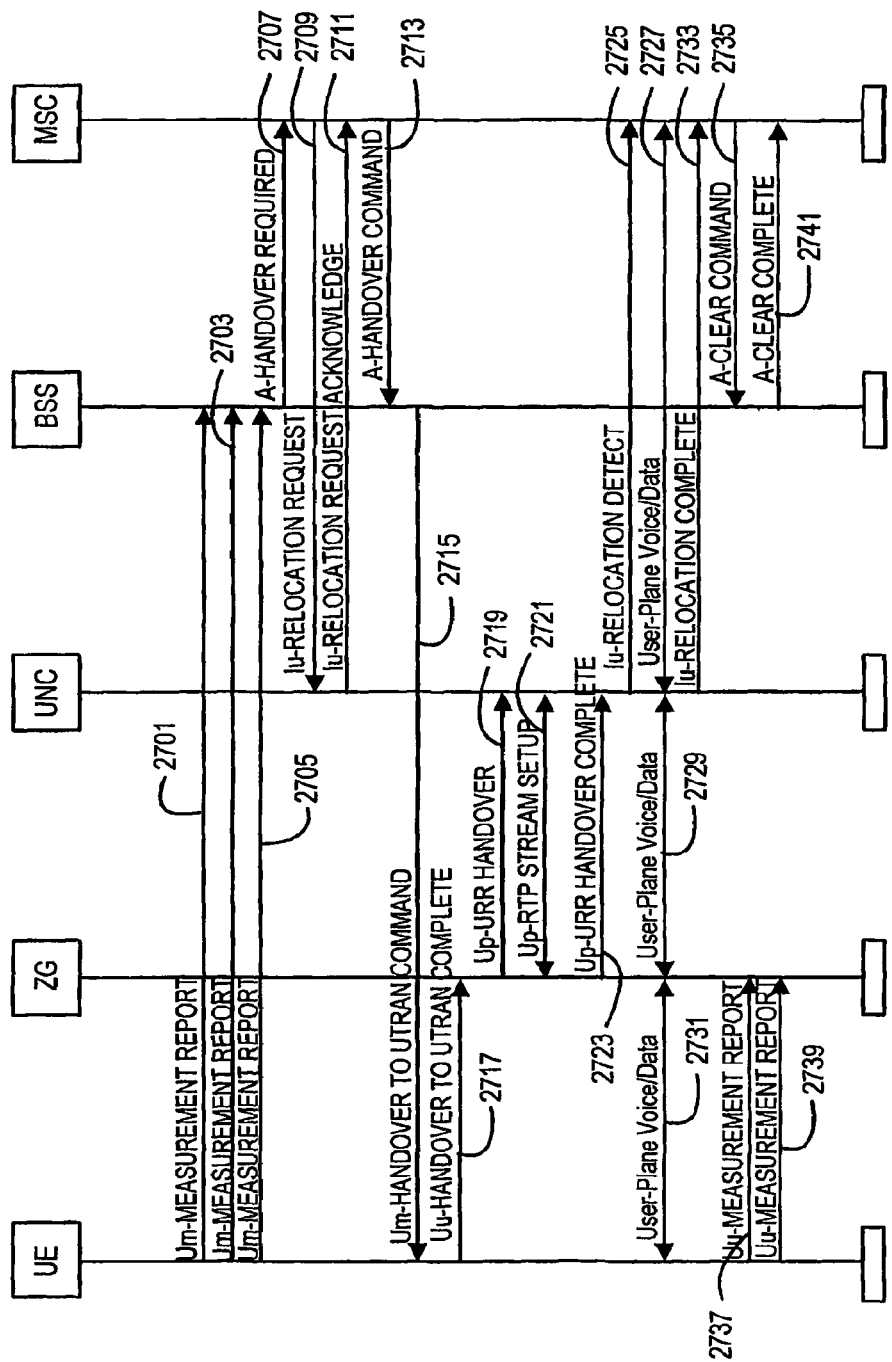
FIG. 27 illustrates a process according to an aspect of the present invention.

The GERAN to UMAN-UMTS sequence shown in FIG. 27 assumes that the UE has an active voice call on the GERAN. The message interchange shown in FIG. 27 is summarised in the following sequence of steps:

The multiband UE sends MEASUREMENT REPORTs 2701, 2703, 2705 on a continual basis to the BSS containing the {ARFCN,BSIC} of the surrounding GERAN cells, and the {Primary Scrambling Code, UARFCN, Cell Identity} or the surrounding UMTS cells.

The basestation 110 should be reported by the UE as having the highest signal level compared to the serving and neighbouring GERAN cells.

The BSS internally maps the basestation 110 {Primary Scrambling Code, UARFCN, Cell Identity} to a UMA cell CGI. The GERAN decides to handover to the UMA cell by sending a HANDOVER REQUIRED message 2707 to the core network MSC.

The core network requests the target UNC to allocate resources for the handover using the RELOCATION REQUEST message 2709. The UNC should map the IMSI contained in the RELOCATION REQUEST to the UE user's home basestation 110. The target home basestation 110 may or may not be the basestation 110 seen currently by the UE.

The target UNC acknowledges the request, using the RELOCATION REQUEST ACKNOWLEDGE 2711, indicating it can support the requested handover, which also contains the HANDOVER COMMAND contents indicating the home basestation radio channel parameters to which the UE should be directed.

The core network forwards the HANDOVER COMMAND 2713 to the GERAN, completing the handover preparation.

The GERAN sends the HANDOVER TO UTRAN COMMAND 2715 to the UE to indicate a handover to the basestation 110. The HANDOVER TO UTRAN COMMAND contains the UARFCN and primary scrambling code of the target basestation. The UE does not switch its audio path from GERAN to UMAN until handover completion.

The UE accesses the basestation 110 using the HANDOVER TO UTRAN COMPLETE message 2717. The handover reference contained in the message is passed to the UNA in the URR HANDOVER ACCESS message 2719, which allows the serving UNC to correlate the handover to the RELOCATION REQUEST ACKNOWLEDGE message. The serving UNC sets up the bearer path with the basestation 110 and UE.

The basestation 110 transmits the URR HANDOVER COMPLETE message 2723 to indicate the completion of the handover procedure. The UE switches from the GERAN user plane to the UMAN user plane.

Bi-directional voice and/or data traffic 2727, 2729, 2731 is flowing between the UE and core network via the serving UNC.

The target UNC indicates the handover is complete, using the RELOCATION COMPLETE message 2733. If not already done so, the core network switches the user plane from the source GERAN to the target UMAN.

The core network tears down the connection to the source GERAN using the CLEAR COMMAND 2735.

The source GERAN confirms the release of GERAN resources allocated for this call, using CLEAR COMPLETE 2741.

The basestation 110 is designed to be used as a "public access" system for application in shops, bars, restaurants and other public areas, and as a restricted access system for application in homes and offices.

For public access application, the basestation 110 will identify itself with the same Public Land Mobile Network (PLMN) identifier as the owning operator's network—the basestation 110 appears as another basestation in the network which a mobile will roam onto when the received signal strength of the basestation 110 exceeds that of other basestations.

For home or office applications it is often highly desirable to restrict access to the basestation 110 to only those subscribers who are paying for the basestation 110 and associated DSL line. The present invention includes a scheme to control access to the basestation 110 device through a modification to the phone SIM alone, with no requirement for costly modification of a standard GSM/UMTS phone. Using this scheme the owning operator's basestation 110 devices all share a common but different PLMN identifier to the operator's wide area network. When this different PLMN is set as the Home PLMN for a particular mobile in its SIM card then that mobile will preferentially roam to the basestation 110 whenever adequate signal level is detected, regardless of the signal strength of other basestations on the operator's PLMN.

Standard GSM/UMTS UEs when not making a voice or data call—referred to as idle mode—will perform automatic PLMN selection in the following order of priority:
  i) SIM card defined MNO HPLMN (Home PLMN)
  ii) Other SIM card defined PLMNs specified by MNO supplying SIM
  iii) Other detected PLMNs with sufficient signal strength In idle mode, the MS periodically attempts to obtain service on its HPLMN. For this purpose a value of T minutes may be stored in the SIM, range 6 minutes to 8 hours (in 6 minute steps). Therefore by making the HPLMN the MNO ZoneGate network identifier rove-in from the macro-network to basestation 110-network will be automatically performed within a minimum of 6 minutes of the user entering the coverage area of the home basestation 110. Rove-out shall be automatically performed when the user is about to leave the coverage area of the home basestation 110. In order to ensure correct rove-out behaviour the MNO PLMN network identifier should be the highest priority PLMN in the SIM after the HPLMN.

Note that PLMN selection and re-selection is only performed in idle mode. In connected mode, PLMN re-selection is not performed, unless an inter-PLMN handover is activated by the network.

In general, network users not enabled to use the basestation 110 would already be on their HPLMN, or another PLMN if roaming, and would not attempt access to a basestation 110 PLMN unless there was no macro-network coverage. For enabled users, access to a particular basestation 110 is restricted to a small number of users provisioned on that specific device. Because the basestation 110 acts as a standalone GSM/UMTS network to the UE, it is able to extract the International Mobile Station Identifier (IMSI) from standard GSM/UMTS messages exchanged with the UE and thereby make a decision as to whether the UE is allowed to make calls via that basestation 110 or not.

In normal macrocell operation, a UE registers onto a cell by means of a location registration (LR) if the selected or reselected cell has a different registration area (LA/RA) or PLMN. If this is not the case the UE will use an IMSI attach or GPRS attach procedure to register on that cell. The basestation 110 will configure itself to have a different Location Area (and therefore Routing Area) to the macro-network, so that a Location Registration procedure will always be necessary. An IMSI Attach may also be performed during the Location Registration procedure.

During the location registration procedure, a standard LOCATION UPDATING REQUEST message is sent by the UE to the basestation 110, which contains the IMSI. The basestation 110 can reject the request if the IMSI does not match that of one of the provisioned users without having to contact the core network, therefore reducing possible network traffic. If the IMSI is not sent in the LOCATION UPDATING REQUEST, and the TMSI/P-TMSI is unknown by the basestation 110, the IMSI is obtained from the UE through the IDENTITY REQUEST procedure.

It is important to note that the basestation 110 is directly connected to the owning operator's core network and any user roaming from the operator's macro network to the basestation 110 will not be recorded as having left the operator's network by the HLR. The basestation 110 appears as a separate network only to the mobile devices such that the device identities (IMSIs) are revealed via standard GSM/UMTS signaling procedures as the devices cross this network boundary. This enables access to the basestation 110 to be restricted to defined users.

The PLMN selection and Location Registration procedures are mapped by the basestation 110 to the discovery and registration procedures for either UMA or SIP:

For basestation 110 interfaced to the core network via UMA, the UMA discovery procedure is performed when a UE is first attempting service, in order to determine the identity of the default and serving UNC. Following completion of the UMA discovery procedure, the UMA registration procedure is performed between the UE and the UNC in order to inform the UNC that a particular UE is connected and available for mobile-terminated services.

The UMA discovery and registration procedures are performed when a UE successfully selects a particular basestation 110, provisioned to accept it through the GERAN PLMN selection and cell selection procedures. The procedure is described above and illustrated in FIG. 11.

Figure 28:
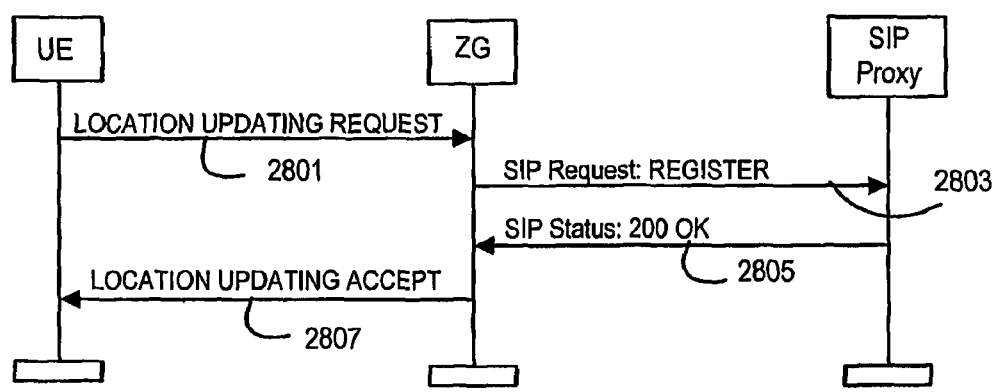
FIG. 28 illustrates a process according to an aspect of the present invention.

For a SIP-enabled basestation 110, the SIP registration procedure shown in FIG. 28 is performed during the UE location registration procedure, in order to register the SIP location information with the network Location Service via the network SIP Registrar Server. SIP authentication may also be enabled during this procedure. The network Location Service holds the location of SIP User Agents so that they are available for mobile-terminated services.

SIP registration with a SIP proxy server shall be triggered by a successful Location Update (GERAN) or Registration Area Update (UTRAN) for registered ZAP UE devices.

Both SIP and UMA registration are only performed if the GSM/UMTS Location Registration procedure is successful. Therefore access to both UMA and SIP is restricted only to authorised users. A subset of the UE parameters exchanged during the Location Registration are also mapped to the SIP and UMA registration procedures.

As mentioned above, the basestation 110 includes an Ethernet LAN port 208 which allows the basestation to be connected into home or office LAN networks. In this configuration the Ethernet LAN provides the connection to the owning operator's network.

For deployment in areas where a single basestation 110 cannot provide sufficient coverage, such as a large home or multi-floor office, multiple basestation 110 devices can be used to provide adequate coverage. Users moving through the office will require their active calls to be handed off between basestation 110 devices to provide seamless coverage. The basestation 110 can support this capability if all the basestations within the office area are connected using a single, common Ethernet LAN.

The handoff procedures use proprietary messaging transmitted between basestations 110 in order to implement and coordinate the handover. The Mobility Management entities in the two basestations, namely the source basestation ZG1 and the handover target basestation ZG2, communicate over the LAN connection using the proprietary messaging. The messages contain information related to the GSM/UMTS settings in each basestation, and information related to the transfer of the current SIP session.

Each Access Point for a basestation 110 is uniquely identified by a SIM. This may be provided as a physical SIM card or as a downloaded piece of software referred to as a "soft-SIM". Each basestation 110 must have a Primary User identified by the operator-supplied SIM of their mobile phone. The basestation Management system 160 will be provisioned with the SIM identifiers for the basestations 110 and the Primary Users and will define basestation User Groups which is an association between at least one basestation SIM and a Primary User SIM. The Primary User will be able to add other user SIMs to the basestation User Group using a variety of mechanisms such as authenticated phone call/email to the Management System or interaction with the webserver of any basestation within the basestation User Group.

A basestation User Group will allow multiple basestation SIMs to be associated with the same Primary User SIM. All the Access Points within the basestation User Group will allow access to the same list of user SIMs (as defined by the Primary User) and will be capable of handover to each other using the proprietary mechanisms described below. Communication between the basestations within a basestation User Group will be enabled by the regular reporting of public or private IP addresses back to the Management System; the Management System will collate the IP address and permitted user information and periodically broadcast it to all basestations within a basestation user group.

A new Access Point being installed into an office environment would obtain an IP Address from the Ethernet LAN, establish communications with the Management System 160 and complete authentication using information from the basestation SIM and Primary User SIM. It will then be added to the basestation User Group for that Primary User which is stored in the Management System 160. The newly installed basestation will then report its IP Address to the Management System 160; the Management System 160 will update the IP address tables stored for the specific basestation User Group and broadcast the updated table and user list to all basestations in the User Group, including the newly installed Access Point. The newly installed Access Point will complete the remaining steps in the self-configuration process described above and will then attempt to communicate with each IP Address in the list broadcast by the Management System; if communication is successful both Access Points exchange further information required such that they can add each other to the BA lists information transmitted on the Broadcast Channel of each Access Point. (GSM/UMTS standards require that parameters of surrounding basestations are included in the System Information broadcast over the Broadcast Channel from any basestation such that UEs can monitor neighbouring basestations in preparation for a potential handover.) The information exchanged is summarized in table 1 below:

TABLE 1

GSM/UMTS information exchanged between Access Points within a Basestation User Group

| Parameter | Interface | Description |
| --- | --- | --- |
| ARFCN, BSIC | GSM/GPRS | The contents of the BA list are a list of the basestation 110 ARFCN frequencies, and the BaseStation Identity Codes. A single basestation 110 shall have one ARFCN and one BSIC. |
| CI | GSM/GPRS/UMTS | The Cell Identity of the basestation 110. |
| LAI | GSM/GPRS/UMTS | The Location Area Identifier that is broadcast by the basestation 110. |
| RAI | GPRS/UMTS | The Routing Area Identifier that is broadcast by the basestation 110. |
| Primary Scrambling Code | UMTS | The primary scrambling code that is used on the basestation 110 primary CPICH. |
| UARFCN | UMTS | The basestation 110 UMTS broadcast frequency. |

The inter Access Point handoff mechanism described here is intended to work with SIP calls only. Seamless handoff to the wide area network cannot be supported with this approach. IP addresses for the UE/MS are requested from the DHCP server of the LAN to which the Access Points are connected; the Access Point to which the MS/UE first connects will act as an IP address proxy for the MS/UE and will request an IP address on behalf of the MS/UE which will be communicated to that MS/UE. As the MS/UEs are handed off between Access Points, the IP address of the MS/UE is preserved whilst the IP Address proxy function will transfer to the new Access Point along with the handed-off MS/UE. For more complex networks where there is no single DHCP server Mobile IP techniques can be used to preserve the MS/UE IP address for the duration of the call.

Figure 29:
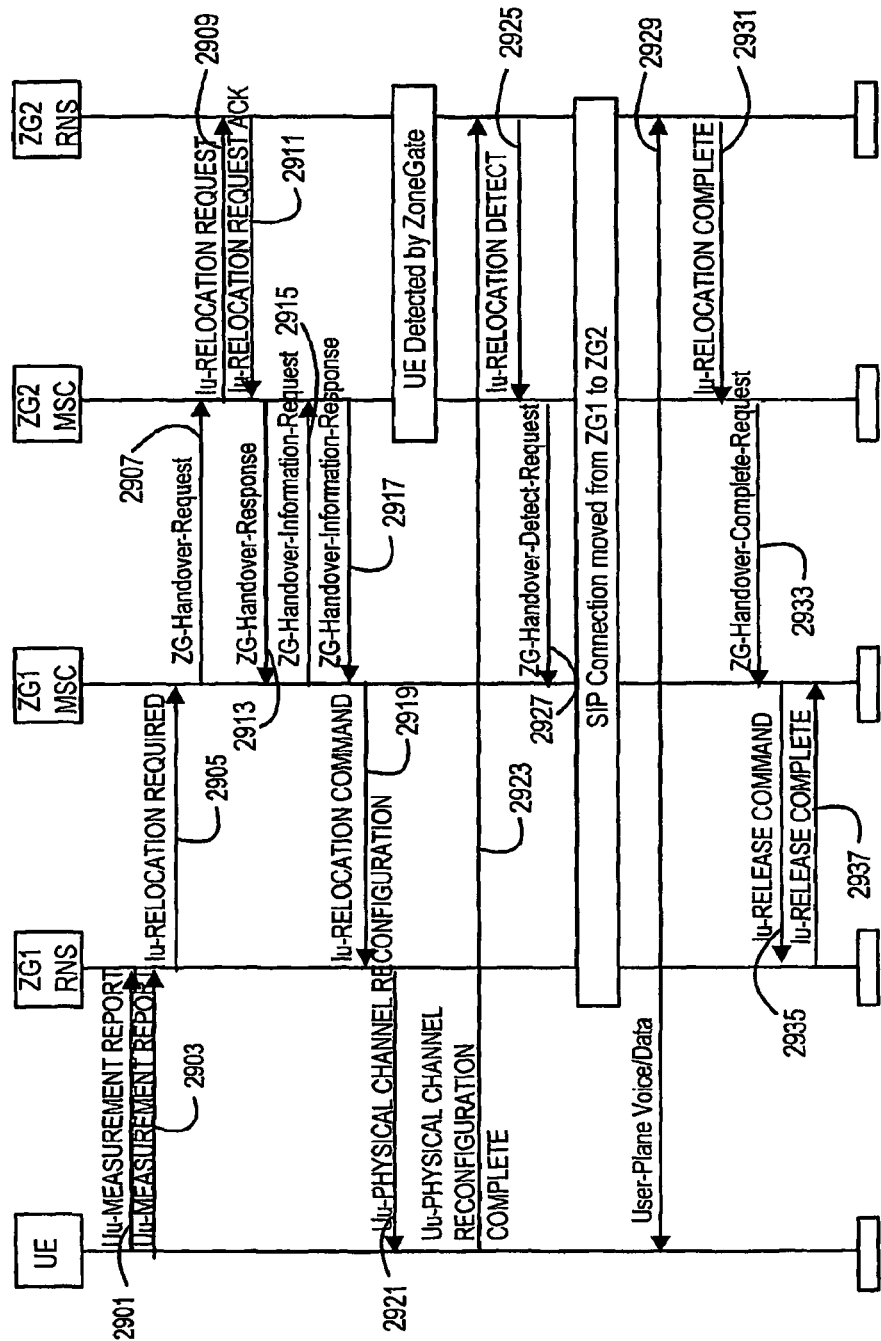
FIG. 29 illustrates a process according to an aspect of the present invention.

The handover signalling is shown in FIG. 29, which in addition divides the basestation 110 functionality into standard 3GPP elements RNS and MSC, where RNS denotes the UMTS Access Stratum protocol entities, and the MSC denotes the Non-Access Stratum protocol entities. All Uu and Iu prefixed signalling is standard 3GPP signalling, all ZG prefixed signalling is proprietary:

The following sequence of steps is executed:

The source basestation ZG1 determines that a handover is required, due to the measurement reports 2901, 2903 received from the UE. The measurement reports indicate that the receiver power level at the UE for the target basestation ZG2 is high, and that the receiver power level at the UE for the current basestation ZG1 is low.

Basestation ZG1 initiates a handover by sending the internal RELOCATION REQUIRED message 2905. The ZG1 sends the proprietary ZG-Handover-Request message 2907 over the LAN to the target basestation ZG2 in order to inform the target that a handover has been requested. The IP address of ZG2 is already known to ZG1 during self-management of the basestations in the LAN network.

The target basestation ZG2 determines whether the handover can take place, and returns the ZG-Handover-Response 2913 to indicate that the request has been accepted. ZG2 generates internal signalling RELOCATION REQUEST 2909 and RELOCATION REQUEST ACKNOWLEDGE 2911.

The ZG-Handover-Information-Request 2915 is transmitted from the first basestation ZG1 to the target basestation ZG2 in order to transfer the current handover and SIP-client settings to the target basestation ZG2 in preparation for the handover. The ZG-Handover-Information-Response 2917 is transmitted in return to transfer the target GSM/UMTS radio-access settings to basestation ZG1.

The handover is initiated by basestation ZG1 by sending the PHYSICAL CHANNEL RECONFIGURATION message 2921 over the UMTS air-interface to the UE. The message also contains the GSM/UMTS radio-access settings from the target ZG2. The UE attempts to register on to the target basestation ZG2 through standard Layer-1 and Layer-2 signalling. The UE is detected by basestation ZG2, which generates internal message RELOCATION DETECT 2925.

The ZG-Handover-Detect-Request message 2927 is transmitted from basestation ZG2 to the source basestation ZG1, to indicate that the UE handover procedure has been successful.

Basestation ZG1 stops reception of the SIP call signalling and traffic packets, and basestation ZG2 starts reception (i.e. processing) of the SIP call signalling and traffic packets. No re-routing of the UE/MS SIP packets are required, as the target IP address is the UE/MS address, and hence is unchanged due to the handover. The LAN connection should ensure both basestations are capable of receiving UE/MS IP packets.

The completion of the handover process is indicated by basestation ZG2 generating the internal RELOCATION COMPLETE message 2931, and sending the ZG-Handover-Complete-Request message 2933 to basestation ZG1. ZG1 releases the call internally through transmission of internal signalling messages RELEASE COMMAND 2935 and RELEASE RESPONSE 2937.

There is therefore disclosed a basestation that allows access to a network operator's cellular network, using a standard cellular phone.

The invention claimed is:

1. A basestation, comprising:
   radio transceiver circuitry, for connection to a wireless communications device by means of a cellular wireless communications protocol; and
   an interface, for connection over an Internet Protocol (IP) network;
   wherein the basestation is adapted to communicate, using Unlicensed Mobile Access (UMA) standard protocols, over said IP network with a UMA network controller, in order to provide communications with said wireless communications device, the wireless communications device sending communications to the basestation by means of said cellular wireless communications protocol, and the basestation sending communications to the UMA network controller by means of said UMA protocol; and
   wherein the basestation is adapted to transform data packets, received from the wireless communications device in a format according to said cellular wireless communications protocol, into a format according to the UMA protocol.

2. A basestation, comprising:
   radio transceiver circuitry, for connection to a wireless communications device by means of a cellular wireless communications protocol; and
   an interface, for connection over an Internet Protocol (IP) network;
   wherein the basestation is adapted to communicate, using Unlicensed Mobile Access (UMA) standard protocols, over said IP network with a UMA network controller, in order to provide communications with said wireless communications device, the UMA network controller sending communications to the basestation by means of said UMA protocol, and the basestation sending communications to the wireless communications device by means of said cellular wireless communications protocol; and
   wherein the basestation is adapted to transform data packets, received from the UMA network controller in a format according to the UMA protocol, into a format according to said cellular wireless communications protocol.

3. A basestation as claimed in claims 1 or 2, wherein said cellular wireless communications protocol is the Global System for Mobile Communications (GSM) protocol.

4. A basestation as claimed in claims 1 or 2, wherein said cellular wireless communications protocol is the General Packet Radio Service (GPRS) protocol.

5. A basestation as claimed in claims 1 or 2, wherein said cellular wireless communications protocol is the GSM Evolution (EDGE) protocol.

6. A basestation as claimed in claims 1 or 2, wherein said cellular wireless communications protocol is the Universal Mobile Telecommunications System (UMTS) protocol.

7. A basestation as claimed in claim 6, wherein said cellular wireless communications protocol is the High-Speed Downlink Packet Access (HSDPA) protocol.

8. A basestation as claimed in claim 7, wherein said basestation is adapted to communicate via said UMA network controller with a radio network of a wireless communications network.

9. A basestation as claimed in claim 7, wherein said basestation is adapted to communicate via said UMA network controller with a core network of a wireless communications network.

10. A basestation as claimed in claim 6, wherein said cellular wireless communications protocol is the High-Speed Uplink Packet Access (HSUPA) protocol.

11. A basestation as claimed in claim 10, wherein said basestation is adapted to communicate via said UMA network controller with a radio network of a wireless communications network.

12. A basestation as claimed in claim 10, wherein said basestation is adapted to communicate via said UMA network controller with a core network of a wireless communications network.

13. A basestation as claimed in claims 1 or 2, wherein said basestation is adapted to communicate via said UMA network controller with a radio network of a wireless communications network.

14. A basestation as claimed in claims 1 or 2, wherein said basestation is adapted to communicate via said UMA network controller with a core network of a wireless communications network.

15. A basestation as claimed in claim 14, wherein said basestation is adapted to request a ciphering key from said core network of said wireless communications network, and, after receipt of said ciphering key, to use said ciphering key for communications with said wireless communications device.

* * * * *